US012600492B2

(12) United States Patent
Marcum

(10) Patent No.: US 12,600,492 B2
(45) Date of Patent: Apr. 14, 2026

(54) AEROSTAT TETHER INSTALLATION, HANDLING, DAMAGE CONTROL, AND QUICK REPLACEMENT SYSTEM

(71) Applicant: Alfred Marcum, LaGrange, KY (US)

(72) Inventor: Alfred Marcum, LaGrange, KY (US)

( * ) Notice: Subject to any disclaimer, the term of this patent is extended or adjusted under 35 U.S.C. 154(b) by 426 days.

(21) Appl. No.: 18/268,955

(22) PCT Filed: Dec. 22, 2021

(86) PCT No.: PCT/US2021/010068
§ 371 (c)(1),
(2) Date: Jun. 21, 2023

(87) PCT Pub. No.: WO2022/139856
PCT Pub. Date: Jun. 30, 2022

(65) Prior Publication Data
US 2024/0059428 A1 Feb. 22, 2024

Related U.S. Application Data

(60) Provisional application No. 63/129,561, filed on Dec. 22, 2020.

(51) Int. Cl.
*B64B 1/58* (2006.01)
*B64F 1/14* (2006.01)

(52) U.S. Cl.
CPC . *B64F 1/14* (2013.01); *B64B 1/58* (2013.01)

(58) Field of Classification Search
CPC ..................................... B64F 1/14; B64B 1/58
See application file for complete search history.

(56) References Cited

U.S. PATENT DOCUMENTS 3,216,466 A * 11/1965 Simko ....................... B64B 1/62
285/104
2013/0299629 A1* 11/2013 Lee ........................... B64B 1/56
244/33

(Continued)

*Primary Examiner* — Tye William Abell
(74) *Attorney, Agent, or Firm* — BRENEMAN & GEORGES

(57) ABSTRACT

An aerostat tether, anchorage, and tether spool system which extends the "On Station" uninterrupted intervals of service for which a "Lighter Than Air" (LTA) aerostat may stay aloft at its designated altitude without requiring retrieval for ground service. Anchoring vessels are provided at both the aerostat and ground control ends of the tethered system which enables remote control of varying choices for bi-directional gas flow patterns within the tether which better facilitate continuous lift gas maintenance and emergency control. The gas routing is selectively controlled per best practice toward the constant filtering and scrubbing of the lift gas within both the aerostat and the tether restraining the aerostat. The system uniquely provides for a very rapid switch-out of tethers by having a full "replacement tether spool" on the ground at the ready which is pre-wound, pre-filled, and sealed with fresh lift gas where it is available at all times for rapid changeout. Quick tether replacement is accomplished by interchangeable quick disconnect fittings at both ends of a hollow tether with a hollow piston valve stem to provide a simple process of unplugging the tether at both the aerostat to close the valves and ground terminal ends and then plugging in the replacement tether to open the valves and reinstituting deployment facilitated by the unique tether spool and anchoring system. The system also enables the effective prevention and dissipation of damage due to torque forces being applied to the tether by a weathervaning aerostat. This is accomplished through counter rotation being applied to the tether at the most advantageous and effective source of tether/aerostat union, at its point of attachment at the aerostat end since the tether attachment (Continued)

point (TAP) is where damage to the tether is most likely to occur. Also favorable to the longevity of service, the aerostat system provides improvements of electrical strike/static build-up dissipation as well as superior tether terminal end preparation, interconnection speed, and short turnaround repair times. The entire aerostat system is designed for plug and play usage and versatility.

13 Claims, 19 Drawing Sheets

(56) References Cited

U.S. PATENT DOCUMENTS

2014/0012433  A1*    1/2014   Vojtech ..................... B64B 1/54
                                                           244/96
2017/0203827  A1*    7/2017   Marcum ................... B64B 1/58

* cited by examiner

100

Inverted Attachment of I-HUB AV Base
to Aerostat

Vertical or Horizontal Attachment of I-Hub AV Base
to Ballast Tank

CONNECTS TO
ROTOR BRUSHES
158

- GAS FLOW -
BOTH CHAMBERS ON
OR
ONE ON

- GAS FLOW -
BOTH CHAMBERS ON
OR
BOTH OFF

100

104

163

176

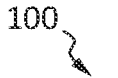
FIG. 19
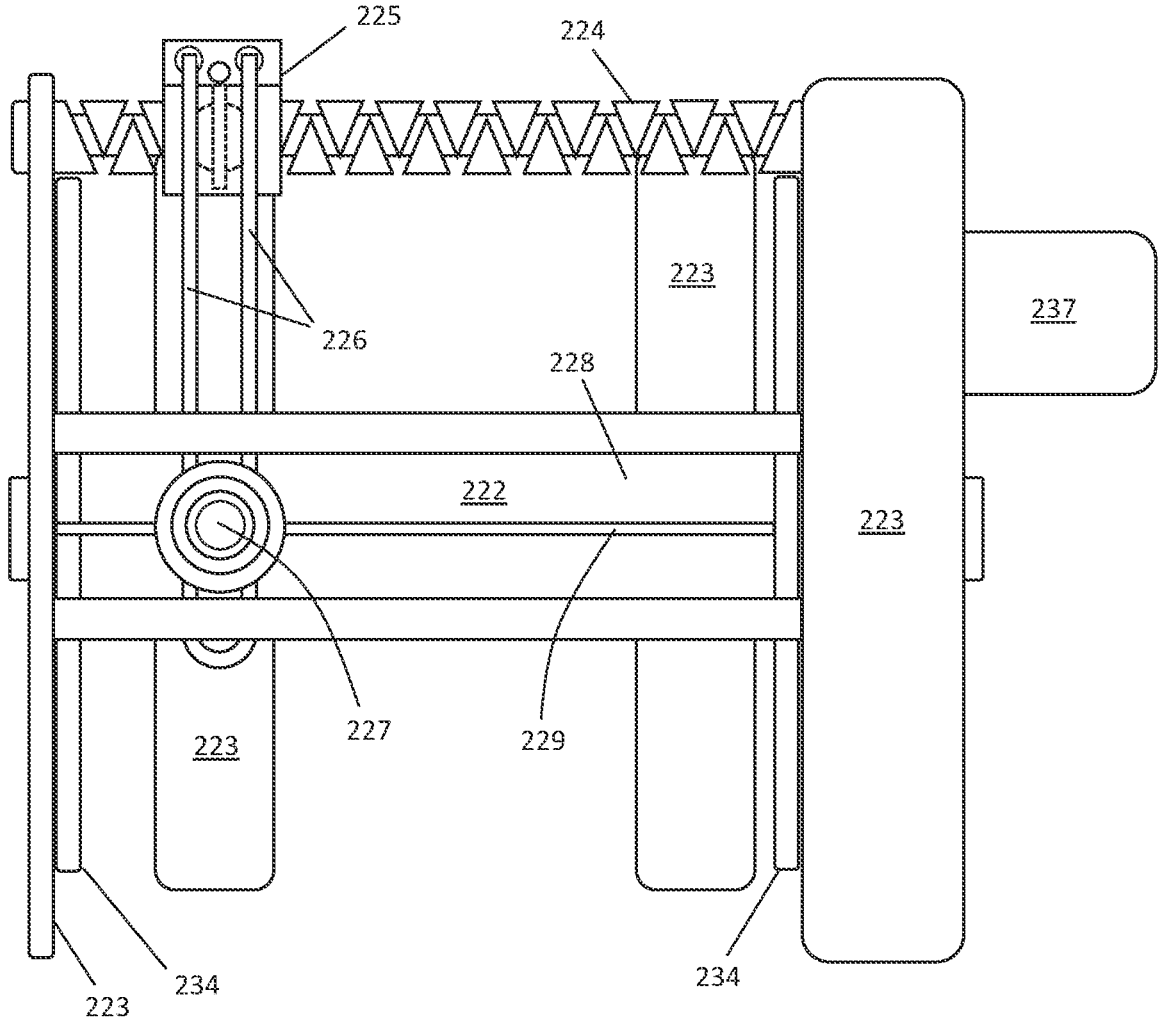

AEROSTAT TETHER INSTALLATION, HANDLING, DAMAGE CONTROL, AND QUICK REPLACEMENT SYSTEM

CROSS REFERENCE TO RELATED APPLICATIONS

This application is related to and entitled to priority based on U.S. Provisional Application No. 63/129,561 filed 22 Dec. 2020 and the disclosure materials therein including drawings and disclosure which bears the title Aerostat Tether Installation, Handling, Damage Control, And Quick Replacement System.

TECHNICAL FIELD

The subject of this invention relates to "lighter-than-air" vehicles and, in particular, aerostats which are anchored to the ground or sea via a tether.

BACKGROUND OF THE INVENTION

1. Field of the Invention

Tethered aerostats are in common use today in performance of various specialized aerial duties requiring a stable platform at altitude. The predominant problem plaguing usage of lighter-than-air vehicles lies with their inability to remain operational over extended periods of time. The capability to stay "on station" with a continuous stream of uninterrupted service would be premium to most, if not all, aerostat designs and tasking assignments.

Platforms for observation, telecommunications, surveillance, advanced photography, and weather forecasting, are all suitable examples whereby adaptability, longevity, and reliability of service are particularly vital attributes.

With further improvements in service consistency, tethered aerostats could offer a gamut of "high altitude" aerial solutions which other modes of communications relay could individually or collectively never match. Major operational advantages realized through lower infrastructure cost, mobility, and very importantly, rapid response time for the establishment of a platforms of substantial height.

During the service period of any Tethered Aerostat System, it is of significant benefit to enable the ground operations team at the Network Operations Center (NOC), also known as the Ground Control Center (GCC), to quickly and efficiently make repairs and perform any required ground maintenance within the shortest time interval possible. This permits the tethered aerostat to be quickly redeployed and returned to the desired altitude in order to service its full package of communications, surveillance, monitoring, and/or other duties which are advantageously conducted from a fixed platform at a chosen elevation overlying the designated footprint of terrestrial or cosmic coverage.

Looking forward, there will continue to be an ever-expanding need for improvements and advances in telecommunications and broadcast capabilities executed from various heights above our earthen planet and others. Tethered aerostats fulfill a niche of affordability, quick reaction, and rapid deployment that space-based broadcast mediums cannot equal. Even with the larger footprints observed and serviced by the space-based infrastructure provided by satellite constellations, there will continue to be definitive reasons and needs for the finer focus capabilities and the lower altitude relay of signals as provided by tethered and free roaming aerostats. This is aptly demonstrated currently by the roll-out of 5G technology and broadcasts where the need for further distribution of last mile signals is required to a ubiquitous number of targets and locations situated very close together.

2. Description of the Prior Art

In the past there have been examples of prior art designs which have made efforts to increase the longevity of aerostat "in air" service before being forced to retrieve the aerostat to ground level to make repairs.

The most significant contributions toward extending the service intervals of aerostats have been made by Yee Chun Lee, U.S. Pat. No. 8,083,174.

SUMMARY OF THE INVENTION

It should be understood for clarity and continuation of concept that some of the terms and descriptions utilized in this specification will be similar to previous description given for U.S. Pat. No. 10,870,475.

The subject invention comprises significant improvements in the restraint and operational control of an aerostat through the novel construction of a "rapid installation" tether and tethered system which decreases the respective time intervals required to perform retrieval, ground maintenance, and redeployment operations for the aerostat. This ambitious tether design tasking is accomplished through the provision of a unique tether spool system in combination with a highly novel tether termination design which utilizes "quick connections" located at the terminal ends of either or both ends of said tether.

The novel design of the tethered system enables the tether to reliably deploy, restrain, and very importantly, provide extended duration service by quickly retrieving the aerostat to ground level to undergo unrestricted scrubbing and removal of lift gas contaminates and performance of other aerostat maintenance procedures which collectively facilitate a very rapid turnaround for fulfilling the necessary ground maintenance objectives before quickly returning the aerostat back to service at the desired altitude whereby uninterrupted long duration "on station" operation intervals are maximized.

More specifically, the novel improvements include the provision of Aerostat, Tether, and Ground Equipment with design, construction, and handling methods and procedures which individually and collectively enable use of a unique "Aerostat Deployment, Anchorage, and Retrieval System" which would facilitate the longest duration and extension of "On-Station" operational duties for the Tethered Aerostat System and the shortest duration of "On-Ground" preparation, repair, and turnaround before redeployment back into service.

The subject invention outlines new ground maintenance equipment and procedures which facilitate increased efficiencies through the provision of a "pre-prepped" rapid interchange/exchange "Quick Tether Replacement System" of low weight which uniquely terminates in a "Tether Pipe Assembly/Top Hat Assembly" (TPA/THA) "at each of the tether's two terminal ends". This versatile system provides a gamut of differing options for the ground control team to choose from after completing their assessment of the repair and refurbishing needs of each individual "aerostat on the ground" examination and maintenance scenario. For example, some repair scenarios might involve damage to either the tether or the aerostat itself whereas another aerostat retrieval only requires reconditioning of the lift gas for the entire tether/aerostat system, or another instance would require outright replacement of the tether. Any increases in the time intervals required to accomplish any of the preceding examples of repair or maintenance procedures would reciprocatively increase the total time the aerostat is on the ground and robs the aerostat system from fulfilling the most precious commodity an aerostat system is designed to provide, that being maximization of the "On Station" operational time. Extension of the "in air", "at altitude", "continuity of uninterrupted service" is the premium outcome for any aerostat system, anywhere.

As outlined and illustrated in the previously mentioned patent citation, the rotatable TPA (Tether Pipe Assembly) and the stationary THA (Top Hat Assembly) are sub-assemblies which when united comprise the master assembly, the RSTE (Removable Sealable Top End) which is inserted within the anchoring vessel thereby sealing its top end. Use of "two (2)" anchoring vessels are thereby provided for improved utilitarian use at both ends of the tethered aerostat system. Upon those two sub-assemblies being unitized as the RSTE, the TPA rotating within the center of the THA, they are inserted and latched down within their respective anchoring vessels thereby forming and providing gaseous containment seals for the top openings of both Anchoring Vessels which are integrally and communicatively attached to both the Aerostat end and the Ground Control end of the tethered aerostat system. This highly novel "replacement tether system" enables the ground operations team to completely changeout/replace a tether "in near instantaneous fashion" by simply unplugging and setting aside the old tether and tether spool before rolling in and plugging in the new. Immediately upon reattaching the terminal ends of the new tether to the ground control "anchorage point" and to the aerostat, full operational capabilities are instantly reestablished enabling near immediate redeployment to begin a new operational cycle. This swap out of tethers quickly establishes "bi-directional communications and multiple gas routing choices for gas maintenance exchange", electrical power, electrical discharge capabilities, and effective restraint which all collectively enable the safe effective operation and monitoring of the aerostat system to be initiated once again from the ground control NOC.

This unique capability enables a used tether having logged significant service time, or a tether that has become damaged or has reached its full term of service, to be quickly removed and replaced with a new pre-prepped tether which has been capped and sealed at both of its terminal ends by remote control valving subsequent to having been filled and fully charged with fresh lift gas. This novel remote control valving system, which is integrally attached to both ends of the pre-prepped tether, is importantly a componential portion of the RSTE master assemblies integrally attached to both of the terminal ends of the tether. This highly valuable improvement enables remote control routing and control of multiple gas passageway possibilities within the hollow sectioned tether leading from the terrestrial based ballast tank, and its interconnected anchoring vessel, through the entire length of the hollow sectioned tether before finally reaching and passing through the anchoring vessel attached to the aerostat itself. Very importantly, the remote-control valving located at each of the terminal ends of the tether enables the replacement tether to be pre-prepped and primed with fresh or renewed lift gas and placed on "emergency standby". It is thereby that the two RSTE's which form the terminal ends of the tether filled with lift gas may be rapidly inserted and latched down within the respective anchoring vessels located at both the Ground Anchor end and the Aerostat end of the tethered system. This unique and near instantaneous "plug-in and use" capability inherent to the "Rapid Replacement Tether System" of this invention drastically reduces "ground service downtime" for the Aerostat system which facilitates its quick turnaround and return back to altitude for continued fulfillment of its operational duties.

This system advantageously enables near instant tether removal and changeout with a "replacement tether" for quick turnaround ground repair and relaunch. This is accomplished by a tether system which provides the capability for the instant removal or insertion of the RSTE assembly from or into the top of the Anchoring Vessel at the ground control end of the tether while providing that same instant removal or insertion capability for the RSTE assembly from or into the top of the Anchoring Vessel located at the aerostat end of the tether. Their collaborative execution facilitates near instantaneous replacement of a damaged tether or a tether which has reached the end of its designated service life.

Further described, the Aerostat/Tether/Ground Anchor system comprises and is releasably coupled together by separate anchoring vessels deployed in near inverted relative position to one another which are in mutual integral communicative connection at one end of the system to the Aerostat through direct attachment to the bottom of the aerostat or, as in the preferred embodiment, to a Tether Attachment Point (TAP) where the anchoring vessel is either directly attached or is suspended from the aerostat by cabling, and finally at the other end of the tether system, to the ground control NOC. This arrangement facilitates a hollow tether to be run between the aerostat and the ground control center which is removably attached to both ends of the system. This is made possible by each of the tether's terminal ends having integral fit and connection to their own respective RSTE assemblies which subsequently undergo respective insertion and latching within and to their respective anchoring vessels at their respective ends of the aerostat system. This enables near instantaneous removal and replacement of a used tether for a new pre-prepped tether. The anchoring vessel at the aerostat end may also be advantageously fit with a wind guidance foil or wing which aids in stabilizing both the anchoring vessel and the aerostat in windy conditions while providing a lowered center of gravity.

One central advantage to having an anchoring vessel located at both ends of the tethered system is that it provides optimum protection for the wall and component integrity of a hollow tether which would otherwise be subject to damage or failure due to the inherent "wind driven" spiraling and twisting of any aerostat while stationed at altitude and anchored to the ground by a tether. The "location" of the damage relief system is the "key to being optimally effective" in the prevention and dissipation of the buildup of those undesired rotational forces upon the tether through equipping the tether with full "counter rotation" capabilities in relation to its "attachment point" to the aerostat. This efficiently relieves "the unwanted and damaging twisting forces enacted upon the tether" at the point of their origination, at the aerostat end of the system. The rotational capabilities of the anchoring vessel system provide powered "motor driven" turning of the TPA within the THA. However, their relationship is also designed to rotate in natural "non-powered" fashion should the power source fail or otherwise be interrupted. Once the rotational forces exerted upon the tether by the spinning "wind driven" aerostat reach a point greater than the resistance of turning the TPA, the TPA rotates and the buildup of torque is dispelled by "unpowered" counter rotation. However, the preferred embodiment remains as the "provision and use of powered turning" of the TPA. Should the power source fail, a backup generator system is provided which engages to supply power from the ground NOC and/or from the aerostat. The powered turning of the TPA may be computer controlled to track and follow the revolving of the aerostat and counter it turn by turn or, alternatively, it may be programmed to turn in arced increments of partial or full rotation(s) to counter the buildup of torque upon the tether caused by the partial or full rotations of the wind driven aerostat. The rotational capabilities provided for the tether at its attachment point to the aerostat may also be supplemented with rotational capabilities also being provided at the tether's point of attachment to the ground anchor. However, this would be duplication of the counter rotation capabilities at both ends of the tether and would only add system value if the drive motor should fail at the aerostat end or some other advantage would be derived from having powered counter rotation at both ends of a very long tether. Otherwise, the drive motor could be omitted from the ground anchoring vessel whereby the natural "unpowered counter rotation of the TPA" previously described, would still remain available and active at ground level to supplement the powered and/or unpowered counter rotation capabilities at the tethers aloft aerostat end. Also, as an option presented in previous patent description, powered counter rotation capabilities may be elected to be provided at ground level only whereby the tether is directly attached to the aerostat without utilization of an aerostat anchoring vessel. For retrieval of the aerostat, this arrangement involves detachment of the RSTE from the ground anchoring vessel and reattaching to an extendable transfer apparatus integral to the tether spool and winch system whereby the extendable transfer apparatus is placed in temporary connection to the RSTE where it is retracted and locked alongside the end of the tether spool for retrieval of the aerostat. However, clear deficiencies accompany a tether having a RSTE provided at only the ground end of the tether as the tether system can no longer provide the instant plug-in use convenience and brevity of installation for both ends of a tethered aerostat system which were earlier described as a pre-prepped rapid interchange/exchange "Replacement Tether System" for the current invention. Also, the current invention importantly improves upon the method and apparatus described in the previous patent for the operation of the tether spool during the aerostat retrieval process through elimination of the need to remove the RSTE from the anchoring vessel for transfer alongside the tether spool to enable aerostat retrieval.

BRIEF DESCRIPTION OF THE DRAWINGS

FIG. 1A illustrates a perspective view of a tethered aerostat and related support structure where said aerostat has been retrieved to the ground for service before redeployment.

FIG. 1B shows an exploded frontal enlargement of the inverted anchoring vessel depicted in FIG. 1A.

FIG. 1C shows an exploded frontal enlargement of the horizontally oriented anchoring vessel depicted in FIG. 1A.

FIG. 2A illustrates an inverted base attached to the aerostat while also pictorially introducing an inverted tether termination assembly.

FIG. 2B illustrates a vertically oriented base attached to the aerostat while also showing a vertical oriented tether termination assembly.

FIGS. 5A-C show perspective arrangements of aerostats and ground control apparatus having been respectively fit with the base portions of anchoring vessels.

FIG. 5A shows an aerostat having its anchoring vessel base suspended from the aerostat.

FIG. 5B shows an aerostat having its anchoring vessel base directly attached to the aerostat.

FIG. 5C shows one of the depicted RSTE's with its end ready to be plugged into its anchoring vessel interconnected to a ballast tank holding a fresh supply of lift gas. The remaining RSTE interconnected on the deployment/retrieval end of the full tether spool is ready to be plugged into one or the other of the two aerostat arrangements shown whereby the aerostat can be deployed to altitude.

FIG. 7A illustrates an anchoring vessel with its quick attachment assembly having been removed.

FIG. 7B illustrates the working surface of the rotor plate component facing out the bottom end of the RSTE.

FIG. 7C illustrates the working surface of the stator plate component facing upward out of the top end of the anchoring vessel.

FIG. 8A shows the components of the quick attachment assembly which is removable or may be reinserted to seal off the top of the anchoring vessel.

FIG. 8B shows the components of tether pipe assembly (TPA) which is connected to the tether and provides the tether with restraint while centering it within a gear/tray/coupler assembly (GTCA) which enables the tether pipe to rotate within the anchoring vessel.

FIG. 8C shows the tether pipe assembly (TPA) without the gear/tray/coupler assembly (GTCA). This depiction combines the tether pipe assembly (TPA) with a tether termination assembly (TTA).

FIG. 9A shows the tether pipe and tether termination assemblies interconnected together and combined as the tether pipe/tether termination assembly while overlying the gear/tray/coupler assembly.

FIG. 9B again shows the tether pipe and tether termination assemblies interconnected together as the tether pipe/tether termination assembly. In addition, the tether pipe assembly/tether termination assembly now passes through and is interconnected to both the gear/tray/coupler assembly and the top hat assembly.

FIG. 9C shows the gears and trays that support and position those gears along with a coupler that interconnects the entire gear assembly with the tether pipe assembly.

FIG. 10A depicts an enlarged view of the rotor and stator platform assemblies shown with portions of the tether termination assembly (TTA) inserted and housed within their respective rotor and stator platforms.

FIG. 10B shows an enlarged view of the components comprising the tether termination assembly (TTA).

FIG. 11A is a top perspective view of the distribution globe.

FIG. 11B is a side view of the distribution globe.

FIG. 11C is a bottom perspective view of the distribution globe.

FIG. 12A shows a top perspective view of the distribution globe and the desired shaping of the terminal ends of the tether before inserting and sealing those ends within the top of the distribution globe. Upon establishing an air-tight seal, the continuity and integrity of the flow of the gas passageways within the tether is established. Also depicted is the handling and interconnection of electrical conductors to the connector posts integral to brushes mounted on the rotor platform which provides housing for the distribution globe.

FIG. 12B shows a side view of the distribution globe and the disposition of electrical couplers staged within specialized cavities of the distribution globe. A radio frequency transmitter is also depicted for relay of signals and power through the rotary joint of the rotor/stator union.

FIG. 12C shows a bottom perspective view of the distribution globe and the best viewing angle of the electrical couplers and a divertor plate which directs the intended flow of gases within the system.

FIG. 13A illustrates cutting to length of the tether and the strip point for removing the outer casing, the handling of restraint fibers embedded in the exterior wall of the tether, and the handling of the fiber optics centralized within the middle of the tether.

FIG. 13B illustrates the preferred shaping of the end of the tether after stripping the outer casing and the lengths left exposed for the electrical and fiber optics cabling.

FIG. 13C illustrates peeling back the tether restraint fibers embedded within the outer casing of the tether. Those exposed fibers have their ends crimped with pull-stops and then are individually clamped between a clamping adapter and drive plate.

FIG. 13D illustrates a preferred cross-section design for the tether.

FIG. 14A show positional settings for the gas flow divertor plate which control choices for use of particular gas passageways and the direction of gas flow within the tether.

FIG. 14B shows an end-to-end depiction of the rotor and stator platform before receiving and housing the tether termination assembly.

FIG. 14C shows an enlargement of a tether termination assembly with an overlay showing the relative position of the rotor and stator plates over the tether termination assembly.

FIG. 19 shows a plan view of the large tether spool as having been centered within the tether spool frame and a level wind system provided to smoothly guide and lay down the tether row by row as the aerostat is withdrawn from the sky and tether is wound on the spindle bed of the tether spool.

Note: It is hence forward to be understood that all of the drawings referenced within this specification which have an alpha letter following the same figure numeral, are to be considered as drawings that are specifically interrelated. It is also to be understood that should the master figure numeral be utilized singularly, by itself anywhere within the specification, then it should be additionally recognized that description is being made and given for each and every drawing described within that related family of drawings having the same master figure numeral. For example, if FIGS. 1A, 1B, and 1C are utilized as numbered references in the drawings, then use of the singular term FIG. 1 anywhere within the specification would be inclusive of description given for FIGS. 1A, 1B, and 1C.

DETAILED DESCRIPTION OF THE EMBODIMENTS

Per the following, description will be made for method and apparatus for alleviating several tether design and anchoring deficiencies plaguing the expansion of further widespread usage of tethered aerostat systems. Two of those deficiencies being "the inability to quickly repair, remove, and/or replace an aerostat tether" and/or "the need to improve the efficiency and performance of the anchorage and tether spooling systems for the deployment and retrieval of aerostats through the "outright" quick replacement of one tether spool with another containing a full complement of tether footage sealed with fresh lift gas or maintaining a vacuum.

Both of these problems go to the heart and main focus of this invention which is to lengthen the periods of time for which an aloft aerostat may stay "On Station" in the air, at the designated altitude in performance of its particular aerial tasking duties in a seamless uninterrupted fashion.

Figures 1A, 1B, 1C:
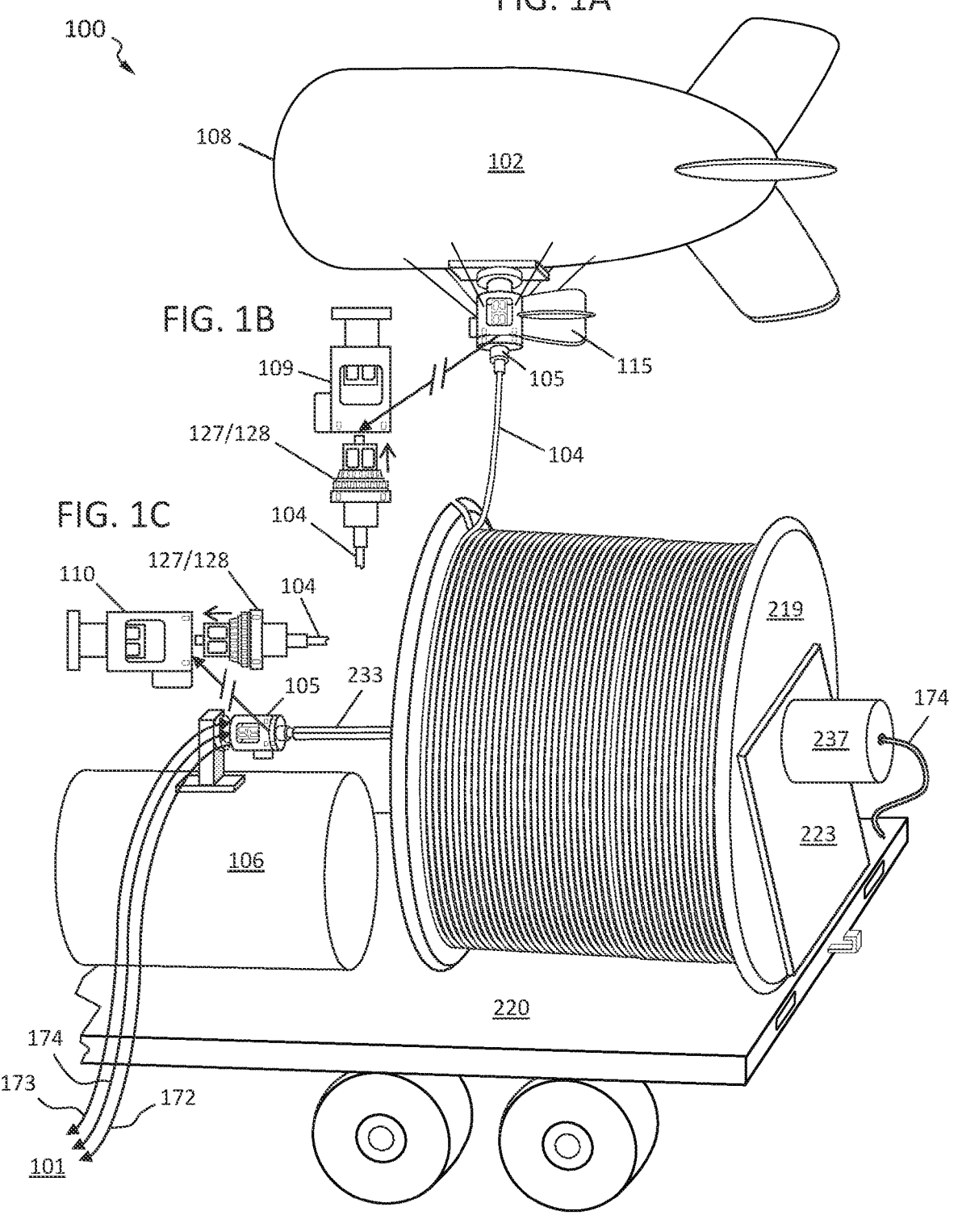
FIGS. 1A-C depict a partial representation of the preferred embodiment of this invention.

Looking first at FIGS. 1A-C, FIG. 1A shows an Aerostat 102 and related Aerostat Deployment, Anchorage, Retrieval System (ADARS) 100 of the subject invention, where said aerostat is currently On the Ground 108 and ready for deployment.

The preferred embodiment employs a Tether 104 whose ends each terminate with a Removable Sealable Top End (RSTE) 127, also known as Removable Rotatable Tether Pipe Assembly (RRTPA) 128. It is thereby that each of these terminal ends may be quickly removed or inserted within their respective Anchoring Vessels 105 located at both the ground end and the aerostat ends of the tethered system.

Figures 8A, 8B, 8C:
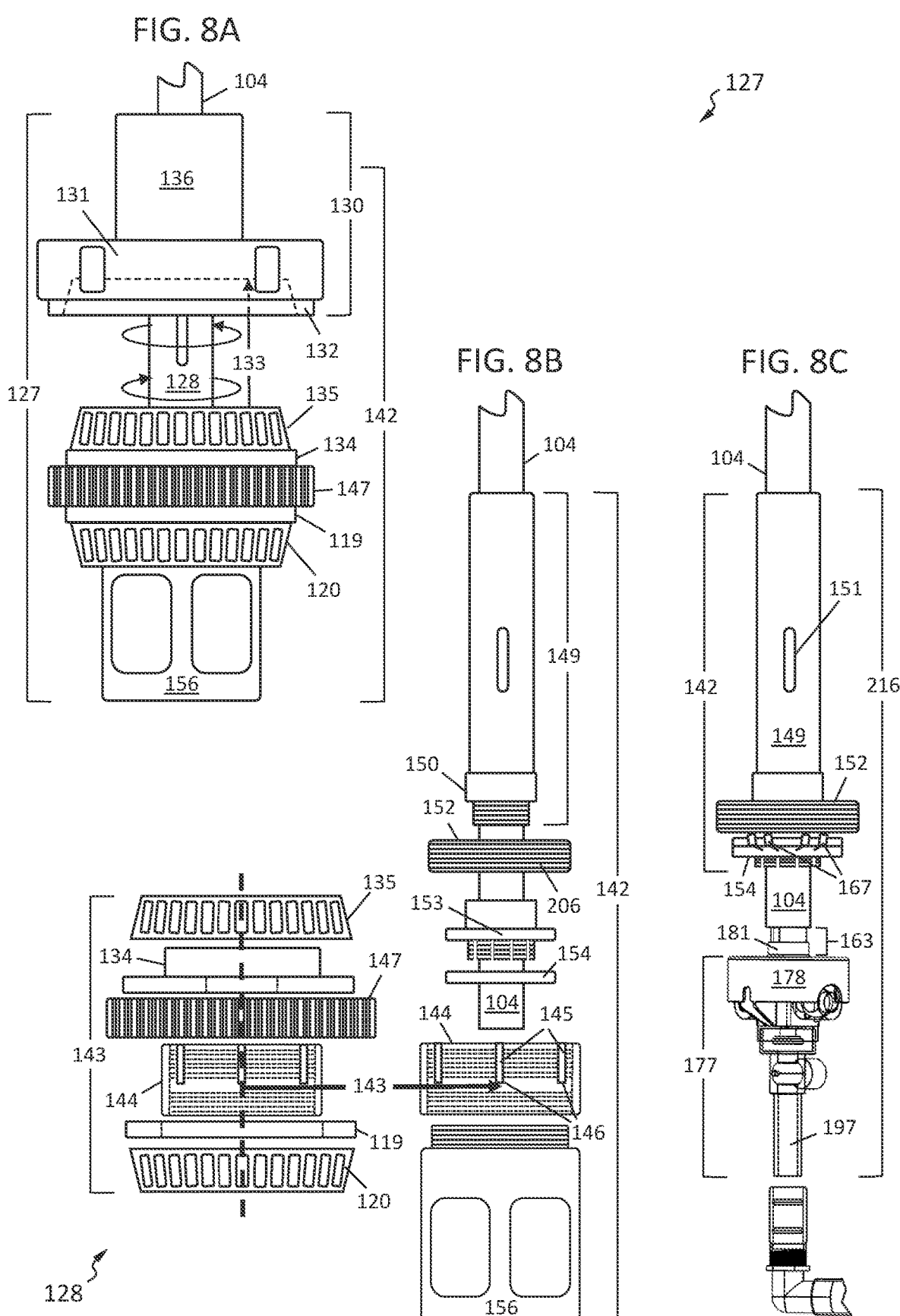
FIGS. 8A-C are side views which depict detail of the working components of the RSTE in combination with the new tether termination assembly (TTA).

Switching briefly to FIG. 8A, the componential parts comprising RSTE 127 provide the tether with bi-directional rotational capabilities where a Tether Pipe Assembly (TPA) 142 rotates within the center of a Top Hat Assembly 130 (THA) at both the ground end and the aerostat end of the system.

Returning to FIG. 1, particular to the current invention the rotational provision provided to the ground based anchoring vessel is primarily important to the interconnection of the tether between the ground anchoring system to and with a novel Tether Spool 219 system which stores the considerable footage of the tether while the powered tether spool provides forced rotational control for the powered deployment and/or retrieval of the aerostat. More importantly, the powered tether spool remains in continuous connection to the aloft aerostat enabling instantaneous retrieval of the aerostat to commence at a moment's notice.

At this point, it should also be importantly recalled and newly recognized that one of primary advantages of providing this "plug-in" design simultaneous with maintaining rotational capability at either end of the tether is its novel design and utilitarian capability whereby near instantaneous connections may be rapidly and collectively established and maintained for aerostat retention, communications, electrical charge dissipation, provision of power, and the choice for selecting and routing of gas passageways within the tether for conducting multi-directional gas exchange between the ground and the aerostat, all while rotative capability is maintained between the tether and each of its anchoring points at both its ground and aerostat ends. It is thereby that a replacement tether, pre-filled and sealed with fresh lift gas, may be easily and rapidly inserted and interchangeably latched within anchoring vessels integrally attached to the both the ground anchor and the aerostat while all of the preceding connections and intercommunications are instantly established and maintained. This is highly novel and valuable improvement which instantly and ably executes the complex task of connecting all of those systems through one very simple and easily accomplished act of "plugging the ends of the tether" into receptacles located at the ground and aerostat ends of the system.

Operational duties at the ground end of the control system, a Network Operations Center (NOC) 101, may be conducted from a Mobile Transport 220 unit which may be further anchored to the ground. Alternatively, the ground system components and the anchoring vessel itself may preferably be anchored to the ground via a non-mobile means such as a Ballast Tank 106 storing fresh lift gas. Either mobile or fixed, the utility interconnections for the tether borne Electrical Conductors 174 cabling, the Fiber Optics 173 cabling, and the grounded Electrical Dissipation 172 cabling are made and conducted between a preferably Horizontal Anchoring Vessel 110 having interconnections with the NOC.

Now continuing with detailed description of system design which enables the preceding to be possible. As depicted in the drawings for the ground anchor end of the replaceable tether system, the orientation and attachment of the long central axis of the ground Anchoring Vessel (AV) 105 of this invention to and with a ballast tank or ground pedestal is done at a Horizontal 110 orientation. Instead of the long axis and the top opening of the anchoring vessel being pointed skyward, it is now rotated 90 degrees whereby the new central axis orientation runs and rotates parallel to the ground. This new orientation for the anchoring vessel places its own central axis of rotation in parallel to the central axis of rotation for an adjacent Tether Spool 219 which is powered by a motor enabling the tether storage spool to rotate as a winch to provide powered deployment and retrieval control for the lighter than air aerostat. The respective long central axes of the ground-based anchoring vessel and the tether spool are oriented not only in parallel but also are aligned end to end whereby the central rotation of their respective axes may revolve as one unit. It is thereby that the powered tether spool of the current invention is designed whereby it may be filled with the entire footage of tether required for the aerostat's particular service height/altitude deployment while the ends of the tether have been prepped to each terminate in a RSTE. In addition, each of the RSTEs generally possess total fit and function interchangeability between one another as well as possessing onboard remote-control valving systems which provide selective control of gas passageway usage within the hollow sectioned tether. It is thereby that the appropriate gas passageway(s) within the spooled tether may be filled with fresh lifting gas or a vacuum drawn where each end is capped off and sealed by their respective RSTE valving system.

Figure 4:
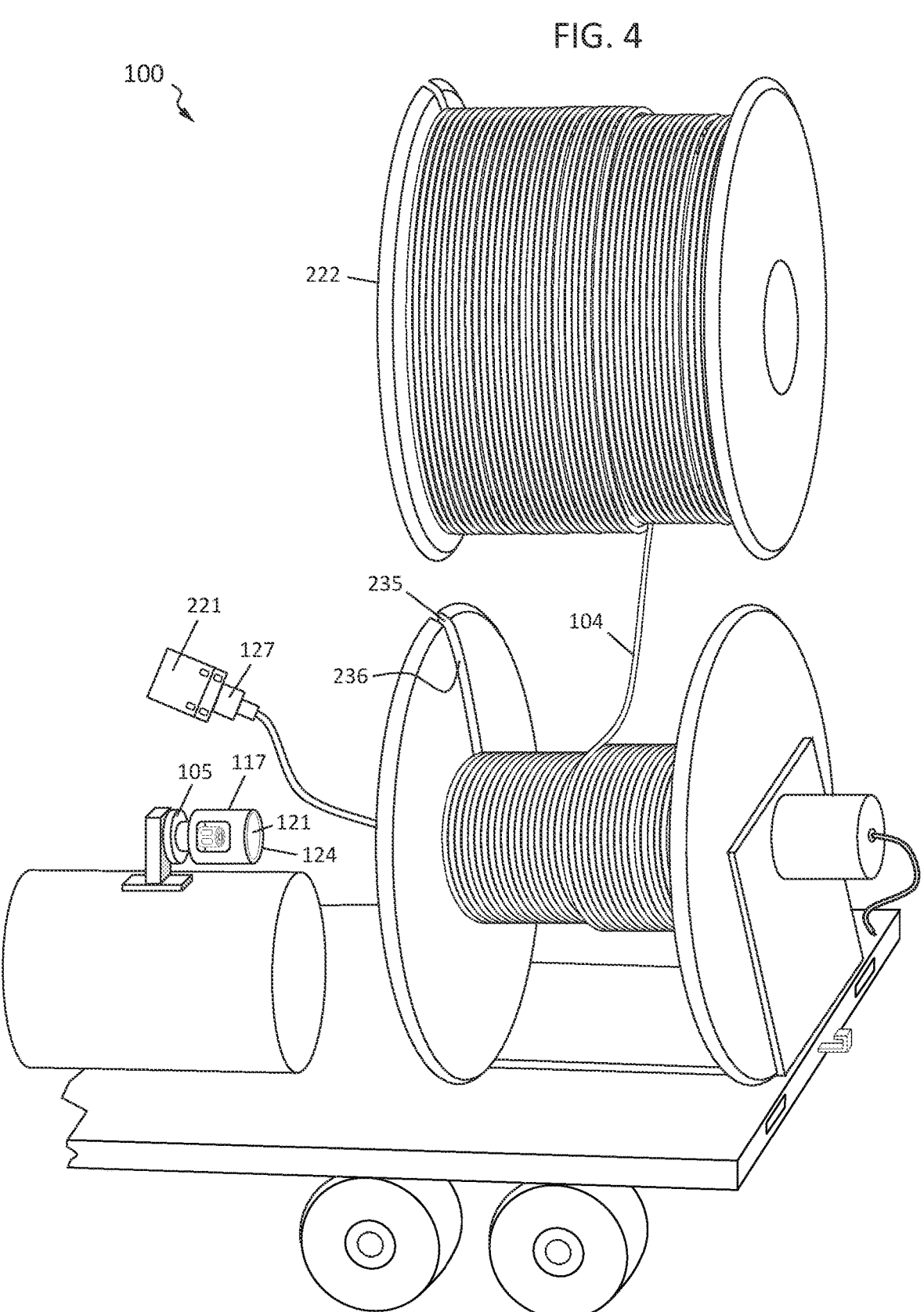
FIG. 4 is a perspective view showing the tether spool having been partially filled with new tether. While spooling the new tether, its first end has been fitted with a protective cover which temporarily encloses a portion of the RSTE.

Now briefly turning to FIG. 4, in prepping an aerostat for initial launch from the NOC, the ends of the spooled tether each terminate in a RSTE which are designed to be inserted and latched within their respective anchoring vessels thereby instantly establishing a full complement of bi-directional gas circulation, communications capability, power, restraint, and electrical charge and torque dissipation systems for the instantly replaceable tether aerostat system. It should be noted here that the terminal ends of the tether have been equipped with their own RSTE's which possess exposed ends which bear rotors and other fragile components. These exposed components lie completely unprotected from receiving handing damage before they may be inserted and latched safely within their respective anchoring vessels. To prevent such physical damage, it is thereby that each of the RSTE's fragile ends located opposite to their interconnection to the tether are thereby provided with and enclosed by a Protective Pot 221, similar to the top of Barrel 117 which forms the Top Open Ends 124 of their respective anchoring vessels. The main purpose of providing the protective pot is to cover the exposed ends of their respective RSTE's until they can be inserted and safely latched within the interior of their respective anchoring vessels. However, it should also be understood that the protective pots might also be equipped with some or all of the same provisions, interconnections, interfaces, and ports which are provided for the anchoring vessels themselves thereby enabling testing and analysis to be conducted with the NOC while the rolled tether is still on the spool.

Per FIGS. 1A and 1B, it is shown that the end of the spooled tether which terminates with a RSTE located at the opposite end of the tether to the ground, is designated to be inserted and latched within the anchoring vessel at the Aerostat end of the system thereby providing powered winched control for the deployment and retrieval of said aerostat. An Inverted Anchoring Vessel 105 is attached to Aerostat 102 where the inverted anchoring vessel is outfitted with a complementary wind control device in the form of Air Rudder/Foil 115.

Figures 2A, 2B:
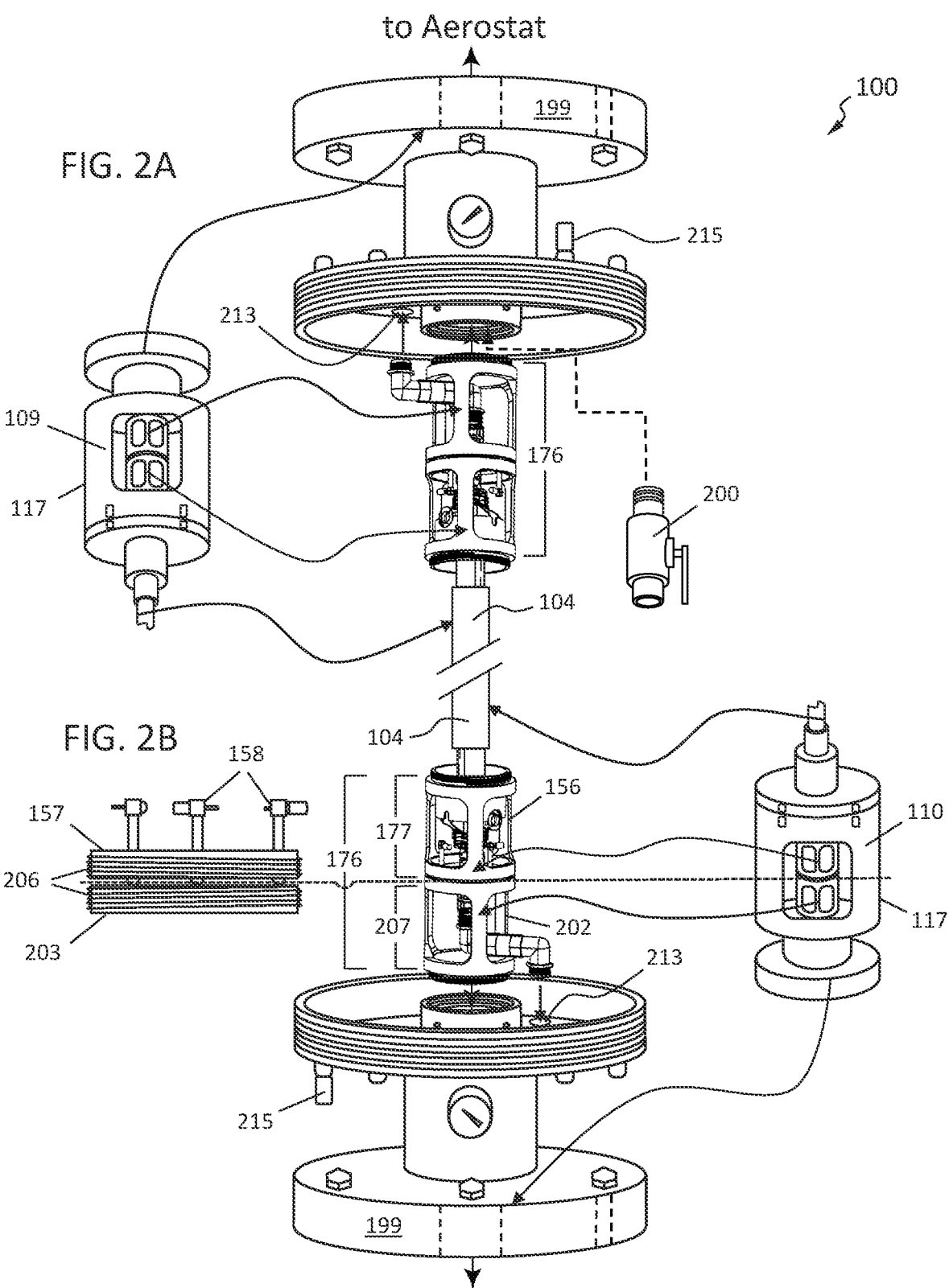
FIGS. 2A-B show perspective views of the structure comprising the base units used to secure the anchoring vessels at both the ground and aerostat ends of the tethered system. Both depictions additionally introduce new structure and apparatus to be included within the anchoring vessels.

FIGS. 2A-B show perspective views of the I-Hub 199 structure comprising the base units used to attach the anchoring vessels at both the ground and aerostat ends of the tethered system. The drawings depict the I-Hub structures, and the Anchoring Vessels 109 and 110 they secure, to be inverted to one another with a substantial length of Tether 104 running between them.

Both I-Hub bases are similarly equipped with main Shut-off Valves 200 and are primarily purposed with providing direct connection and positioning of Barrels 117 and Stator Platforms 202 bearing Stator Plates 203 which directly oppose Rotor Plates 157 and Rotor Platforms 156 suspended from the top of the anchoring vessels.

Figure 6:
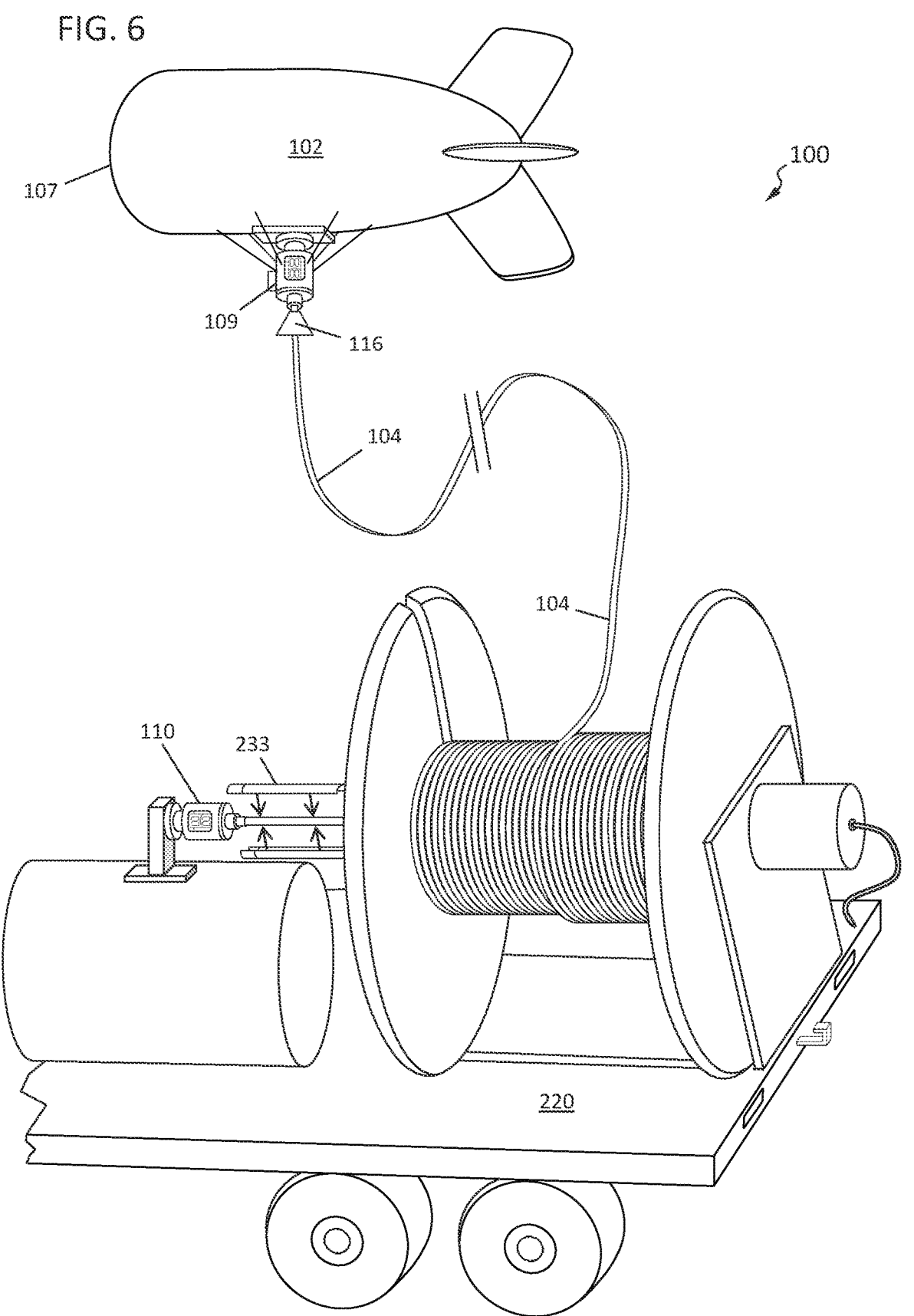
FIG. 6 is a perspective drawing showing the ends of the tether bearing the RSTE's having been plugged in and latched within their respective anchoring vessels at the aerostat and ground ends which enable the aerostat to have been deployed to the desired altitude.

Viewing FIGS. 3 and 6, more detail is now provided for how the RSTE of the ground anchor end of the tether is first to be wound onto the tether storage spool and subsequently inserted and latched within the ground-based anchoring vessel. To accommodate the anchoring vessel/tether spool rotational arrangement the rotational long central axis of the ground anchoring vessel and the long central axis of the tether storage spool are oriented in parallel end to end positions whereby each occupies a plane having the same centers of rotation.

It should be understood that before loading a replacement tether onto a spool, a select length of tether in excess of the distance required to reach the adjacent ground-based anchoring vessel is purposefully left outside the spool's Endplate 234 which has an End Plate Slot 235. This excess tether footage must importantly remain outside of the spool's slotted endplate before beginning to thread the tether through the end plate entering the Spindle Interior 231 and on through the intersecting Spindle Slot 229 of the Spindle Bed 228. Upon the tether being threaded completely across the thru-slot of the spindle bed, it reaches and contacts the intersection of the opposing "unslotted" endplate where the tether will breach the top of the spindle bed at the point the bed adjoins the opposing endplate. A tether positional clamp may be provided at the breach point on the spool to ensure the tether will not slip during initial powered winding of the spool.

The footage of the tether may now be wound upon the tether spool until reaching the end of the tether which will terminate in a RSTE that is to be interconnected within the aerostat's anchoring vessel.

Figure 3:
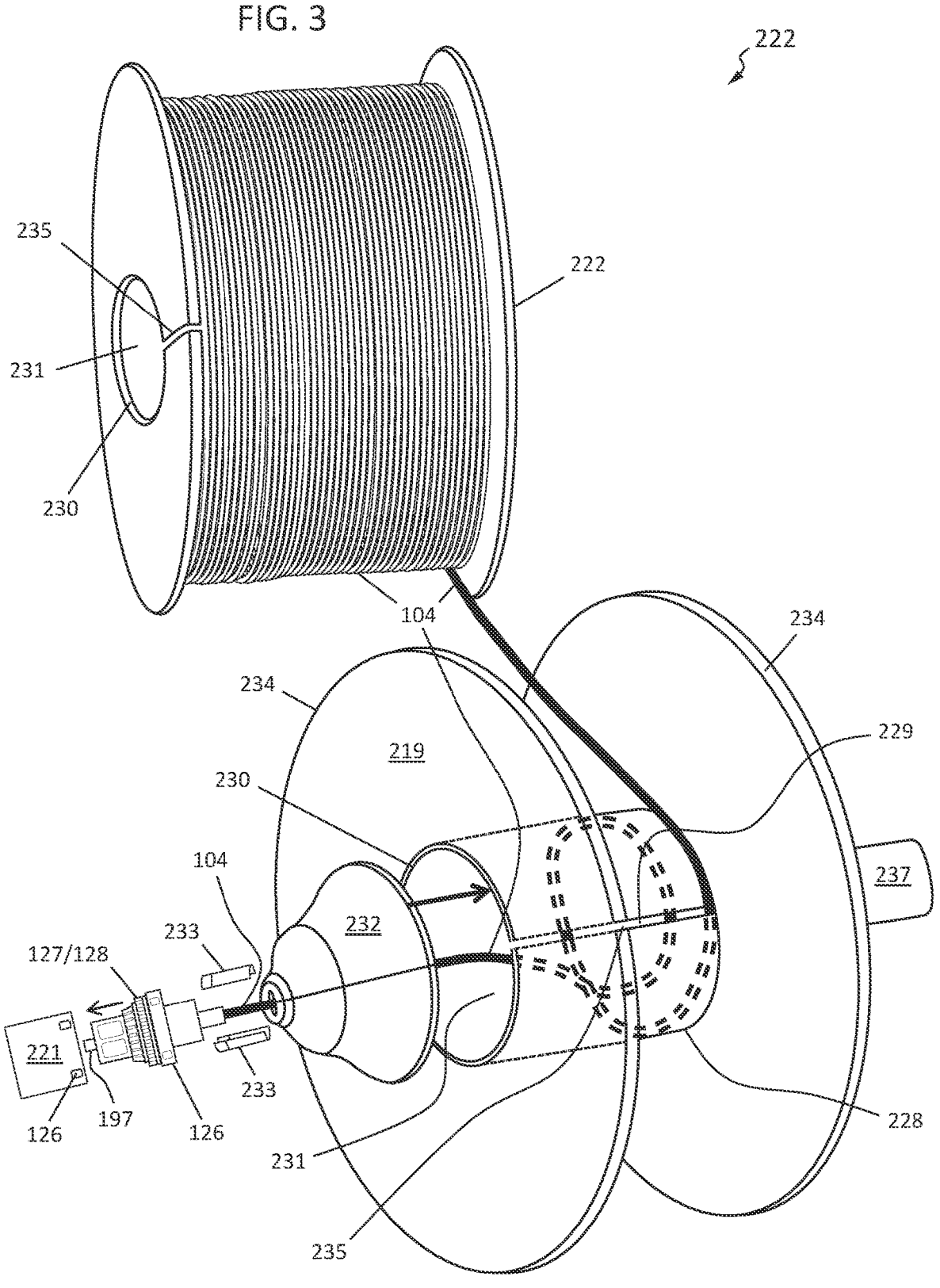
FIG. 3 is a perspective depiction of an empty "tether supply spool" which is equipped with novel physical arrangements. The tether spool is to be filled with a full complement of new tether. The end of the new tether has been fitted with a quick attachment assembly named the Removeable Sealable Top End (RSTE) which will subsequently be plugged in or withdrawn from the top of the ground based anchoring vessel.

Looking at FIG. 3, the RSTE attached to the ground end of the tether has an excess of length that was purposefully provided for the tether as it runs back into the Spindle Interior 231 of the tether spool. This excess length is removed by coiling the extra length within the inside of the tether spool. This is accomplished by hand rotation and coiling of the tether creating one or two loose "free forming coils" of tether within the interior of the spindle before the tether reaches its clamped exit point. The RSTE can now be inserted and latched to the Horizontal Anchoring Vessel 110.

There is an important purpose for creating these loose "unstressed" free flowing coils within the tether spindle interior. That purpose is to not create any crimp or constriction points anywhere along the tether footage. Since the tether is hollow with passageways running the entirety of its length, any twists or short bends in the tether would clamp "shut-off" the flow of gas within these gas passageways as well as having potential deleterious effects for the componential content within the tether inclusive of fragile fiber optics. This desire to protect the tether from twists and points of constriction is similar to the previously described effects that a spiraling aerostat exerts upon the tether. These wind-driven instances of torque being applied to the tether have carefully and painstakingly been compensated for by providing the system with the powered rotation capability of the RSTE at the origination point of the torquing forces where the tether is interconnected to the aerostat anchoring vessel.

The avoidance of constriction points and abrupt bends remains as an essential design point for the tether and the deployment/retrieval system of the current invention. The desire "to create an anchored tether system whereby the free flow of gas and the protection of the componential content within the tether, is to be provided continuously along the entirety of the tether. This is inclusive of the portion of the tether which remains coiled in rotational storage within the interior of the spindle of the tether spool.

Returning to FIGS. 3 and 6, now that the excess length of the tether running between the ground-based anchor and the tether spool has been free coiled within the interior of the spindle of the tether spool, novel final component parts are added between those two rotational structures to encase the tether. The purpose of providing the tether encasement is to remove all torsion forces from ever being exerted upon the tether whenever the winching motor of the tether spool applies powered rotational force during aerostat deployment or retrieval. The duty of these new rotational support components is simple, to carry and transfer all rotational forces exerted by the powered rotation of the tether spool directly to the ground-based anchor without any torque being transferred to the underlying tether which they encase.

A Bell Reducer 232 is provided that is split into two identical longitudinal halves which may assembled over the tether. The halves of the bell reducer are assembled around the tether whereby the large end of the assembled bell reducer is inserted and interlocks within the Spindle End Opening 230 of the tether spool. This transfers all rotational forces exerted by the tether spool to the smaller end of the bell reducer which is provided with a short connector flange terminating in a hole having an inner diameter slightly larger than the outer diameter of the tether that the assembled bell reducer encases.

The last component required is a long straight pipe adapter called a Rigid Tether Encasement 233 whose construction includes short, expanded sections at both of its ends. The rigid encasement is split into two identical longitudinal halves which are to be assembled around the portion of the tether for which they are to enclose and support. The two casing halves are designed to surround and protect the exterior of the tether and lock all tether spool rotation with anchoring vessel rotation since they are unitized together as one rotational unit.

One expanded end of the rigid encasement is clamped over the short connector flange comprising the small end of the bell adapter. The remaining end of the rigid encasement runs to the Horizontal Oriented Anchoring Vessel 110 where it is clamped around and locked upon the outer diameter of the terminal end of the Tether Pipe Assembly (TPA) as it exits through the Top Hat Assembly (THA) that together comprise the Removable Sealable Top End (RSTE) of the ground-based anchoring vessel. Keyed interlock shaping is provided at both ends of the rigid encasement to ensure a rotational interlock between the tether pipe and the bell reducer and the tether spool.

It is recalled that the anchoring vessel is oriented parallel to the ground and is oriented in end-to-end rotational alignment with the central rotational axis of the tether spool. It is thereby that all powered rotational forces generated by the bi-directional motor of a winch system which selectively turn the tether spool in forward or reverse directions for either the deployment or retrieval of the aerostat, are directly and totally transferred between the tether spool and the ground-based anchoring vessel. Due to the interlocking between Tether Spool 219 and the Horizontal Anchoring Vessel 110, there are no rotational forces transferred to the underlying Tether 104 whatsoever since the tether is encased and protected within the interlocked components comprising the rotational force transfer system.

The winch turns the tether spool which rotates the assembled bell reducer which rotates the assembled rigid encasement which rotates the tether pipe of the Tether Pipe Assembly (THA) that functions as the rotational componential half of the Removable Sealable Top End (RSTE) of the ground-based anchoring vessel. The clamping/fastening system employed for the interconnections for the just described rotational force transfer system running between the tether spool and the ground anchoring vessel may use interlocking shapes between the rotational components, or use fasteners, or simply use adjustable pipe clamps or other fastening methods, combinations, or devices known to the art.

Figure 5C:
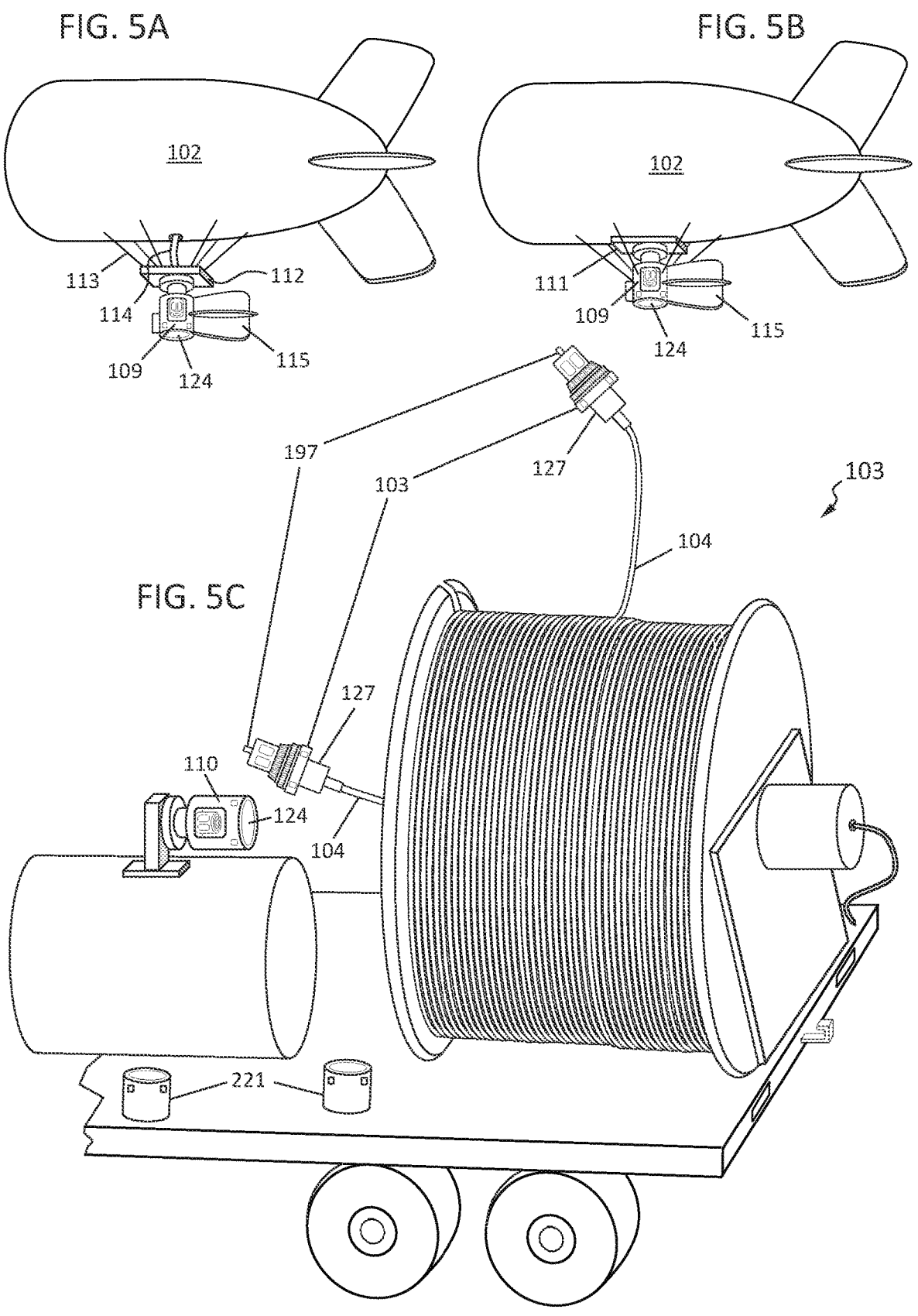

Switching to FIGS. 5A-B, perspective views of arrangements are shown for two aerostats having been respectively fit with differing base plate options for the attachment of the Inverted Anchoring Vessels 109 to Aerostat 102. FIG. 5A shows an aerostat having a Suspended Mounted Base Plate 112 whereby the anchoring vessel is suspended a select distance from the aerostat via Suspension Cabling 113. FIG. 5B shows an aerostat having a Direct Mounted Base Plate 111 where its anchoring vessel is generally directly attached to the aerostat but still utilizes Suspension Cabling 113 for stabilization of the anchoring vessel while in the air and improved handling while the aerostat is on the ground. FIG. 5C shows one of the depicted RSTE's with its end ready to be plugged into its anchoring vessel interconnected to a ballast tank holding a fresh supply of lift gas. The remaining RSTE is interconnected on the deployment/retrieval end of the full tether spool which is ready to be plugged into one or the other of the two aerostat arrangements shown whereby the aerostat can subsequently be deployed to altitude. For the sake of clarity, FIGS. 5A and 5B depict base plate attachment options and do not intend to portray the use of two aerostats at the same time from a single tether but certainly do intend to show the capability of quickly replacing a damaged aerostat with another fully prepped replacement aerostat ready for relaunch.

Figures 7A, 7B, 7C:
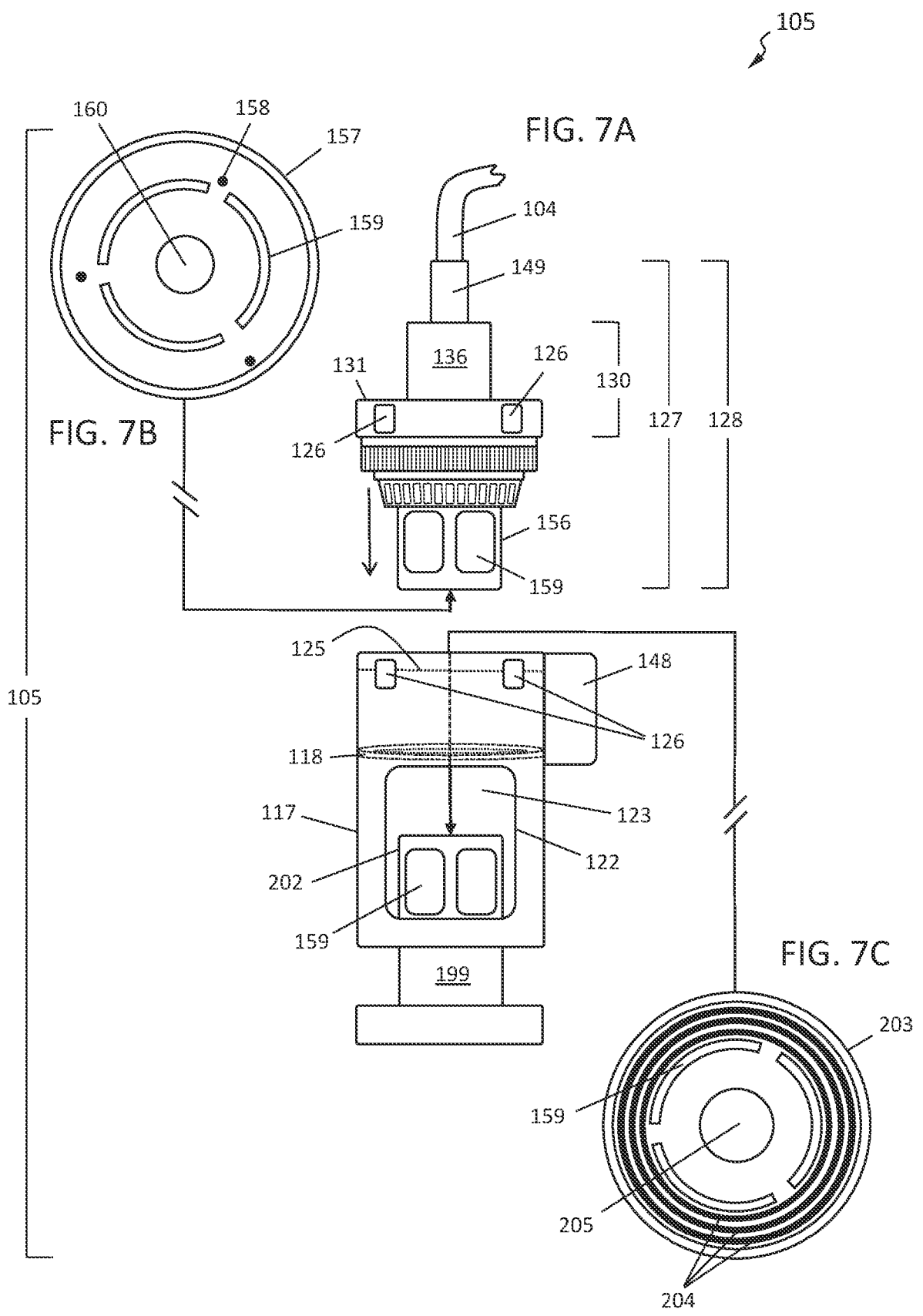
FIGS. 7A-C shows a side exploded view of an anchoring vessel and end views of the respective working "directly opposing" surfaces of the rotor plate and stator plate components.

Looking at FIGS. 7A-C, FIG. 7A illustrates an Anchoring Vessel with its quick attachment assembly RSTE 127 removed. Also significant is the presence of Insert/Twist Vertical Latching 125 profiles prepared on the inside of the Top Open End 124 of Barrel 117 of Anchoring Vessel 105. This insert and twist locking technique for securing the RSTE within the anchoring vessel is only the quick initial latching step. It is followed by a redundant but highly secure closing of Draw Clamp Latches 126. FIGS. 7B-C show the slip ring functioning surfaces and components of the Rotor Plate 157 and Stator Plate 203.

FIGS. 8A-8C, FIG. 8A is a side view of the Removal Sealable Top End 127 where a Tethered Pipe Assembly 142 is shown that has bi-directional rotation within the center of a Top Hat Assembly 130 shown in a "raised position". The Tether Pipe Assembly 142 is comprised of an Upper Tapered Roller Bearing 135 which is positioned in an Upper Roller Bearing Bottom Tray 134. The tether pipe assembly is driven by Main Drive Gear 147 located directly below the upper roller bearing bottom tray and directly above a Lower Roller Bearing Top Tray 119 which carries the Lower Tapered Roller Bearing 120. FIG. 8B is an exploded side view of the Tether Pipe Assembly 142 comprising a Rotor Platform 156 interconnected to Assembly Coupler 144 having Locking Flanges 145 and Vertical Stops 146. A Tether Pipe Adapter 150 is affixed to the bottom end of Tether Pipe 149 and its threaded end slips through a hole within the top of Assembly Plate 152. A Clamping Adapter 153 is threaded onto the bottom of the tether pipe thereby locking the assembly plate against the tether pipe adapter. The top of Assembly Coupler 144 is now threaded onto Assembly Plate 152 and Rotor Platform 156 is screwed within the bottom of Assembly Coupler 144. FIG. 8C shows a side view of Tether Pipe Assembly 142 where Tether Pipe 149 has a Tether Pipe Slot 151 which communicates with the Auxiliary Gas Chamber 139 inside of Chimney 136. Tether Pipe Assembly 142 has interconnection with Tether Termination Assembly 176 where together they form Combined Tether Pipe/Tether Termination Assembly 216.

Figure 9A:
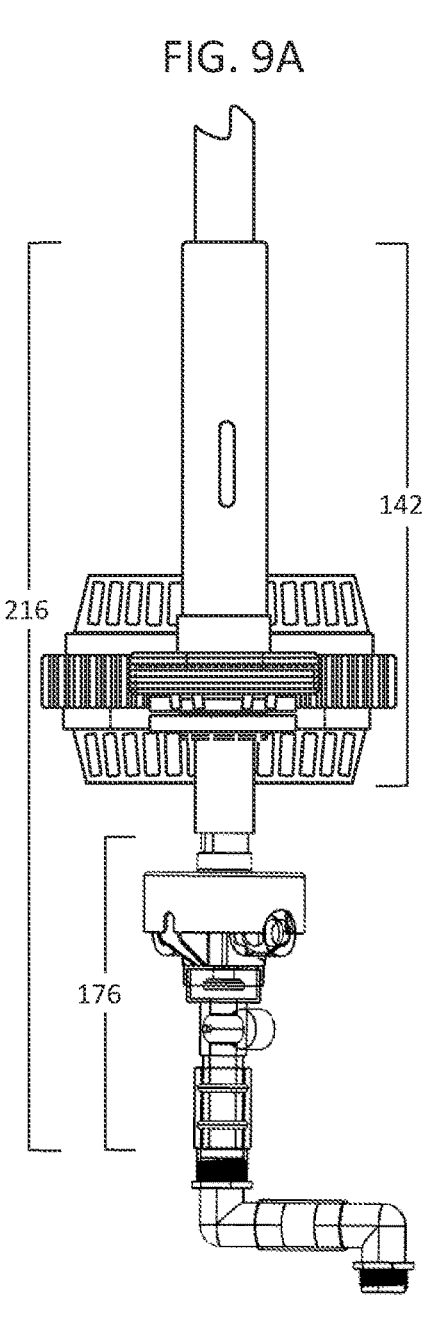
FIGS. 9A-C are side views of the tether pipe assembly (TPA), the tether termination assembly (TTA), the top hat assembly (THA), and the gear/tray/coupler assembly (GTCA).
Figure 9B:
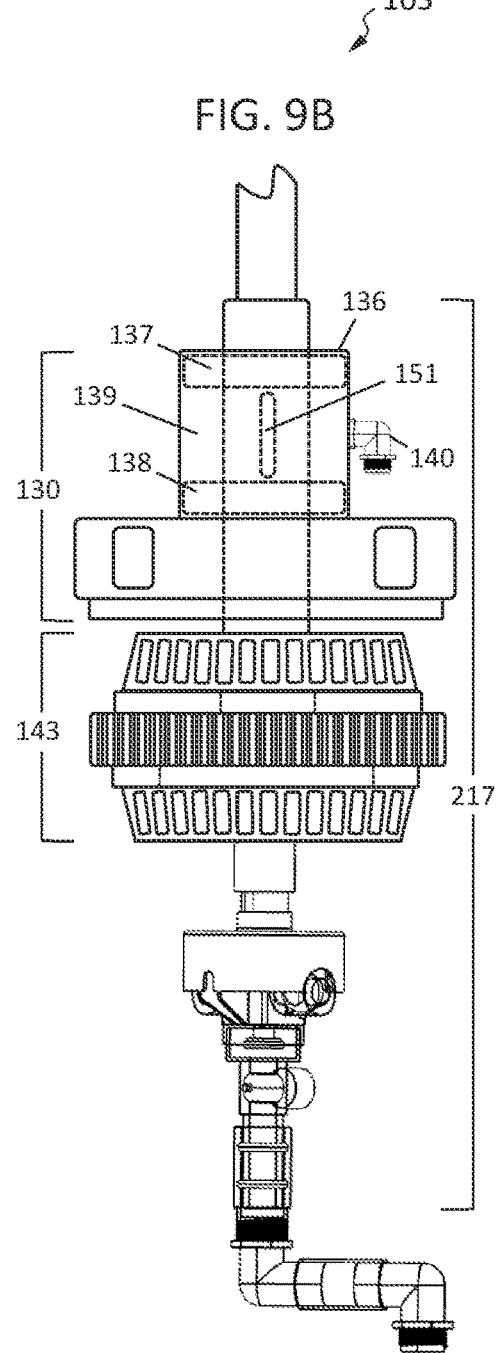
Figure 9C:
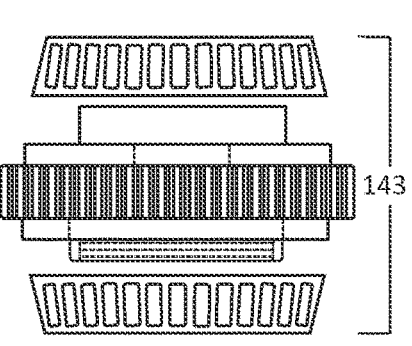

FIG. 9A-C, FIG. 9A shows a side view of a Tether Pipe Assembly 142 coupled with Tether Termination Assembly 176 combining to form Tether Pipe/Tether Assembly 216. The tether pipe assembly overlies Gear/Tray Assembly 143 as further depicted in FIG. 9C. FIG. 9B assembles all of the preceding structures in FIGS. 9A and 9C into Combined THA/TPA/TTA 217 which together form and comprise RSTE 127 or RRTPA 128 which are equivalent structures. The Combined THA/TPA/TTA 217 also includes Top Hat Assembly 130 where the top hat comprises a Chimney 136 having a Chimney Upper Bearing/Tray 137 which forms a top seal around the tether pipe and a Chimney Lower Bearing/Tray 138 which forms a lower seal around the tether pipe thereby together forming an Auxiliary Gas Chamber 139 within Chimney 136 between the two seals. A Chimney Gas Port 140 is provided to create an intake or discharge for Auxiliary Gas Chamber 139.

Figures 10A, 10B:
FIGS. 10A-B are side views of rotor and stator platform assemblies and the tether termination assembly.

FIGS. 10A-B, where FIG. 10B shows the Tether Termination Assembly 176 being passed to the left to be housed within the stacked combination of Rotor Platform 156 over Stator Platform 202 of FIG. 10A. It is to be understood that a Rotor Plate 157 stacked over Stator Plate 203 as shown in FIG. 10B is meant for visualization purposes only. The Rotor and Stator presence in the FIG. 10B drawing is only meant to show the dividing line between what are to be considered as Rotor Housed 177 components of Tether Termination Assembly 176 and what are to be considered as Stator Housed 207 components. The Rotor and Stator are fixtures within the FIG. 10A drawing which are never removed from their adjustable position within Rotor Platform 156 and Stator Platform 202.

Figures 11A, 11B, 11C:
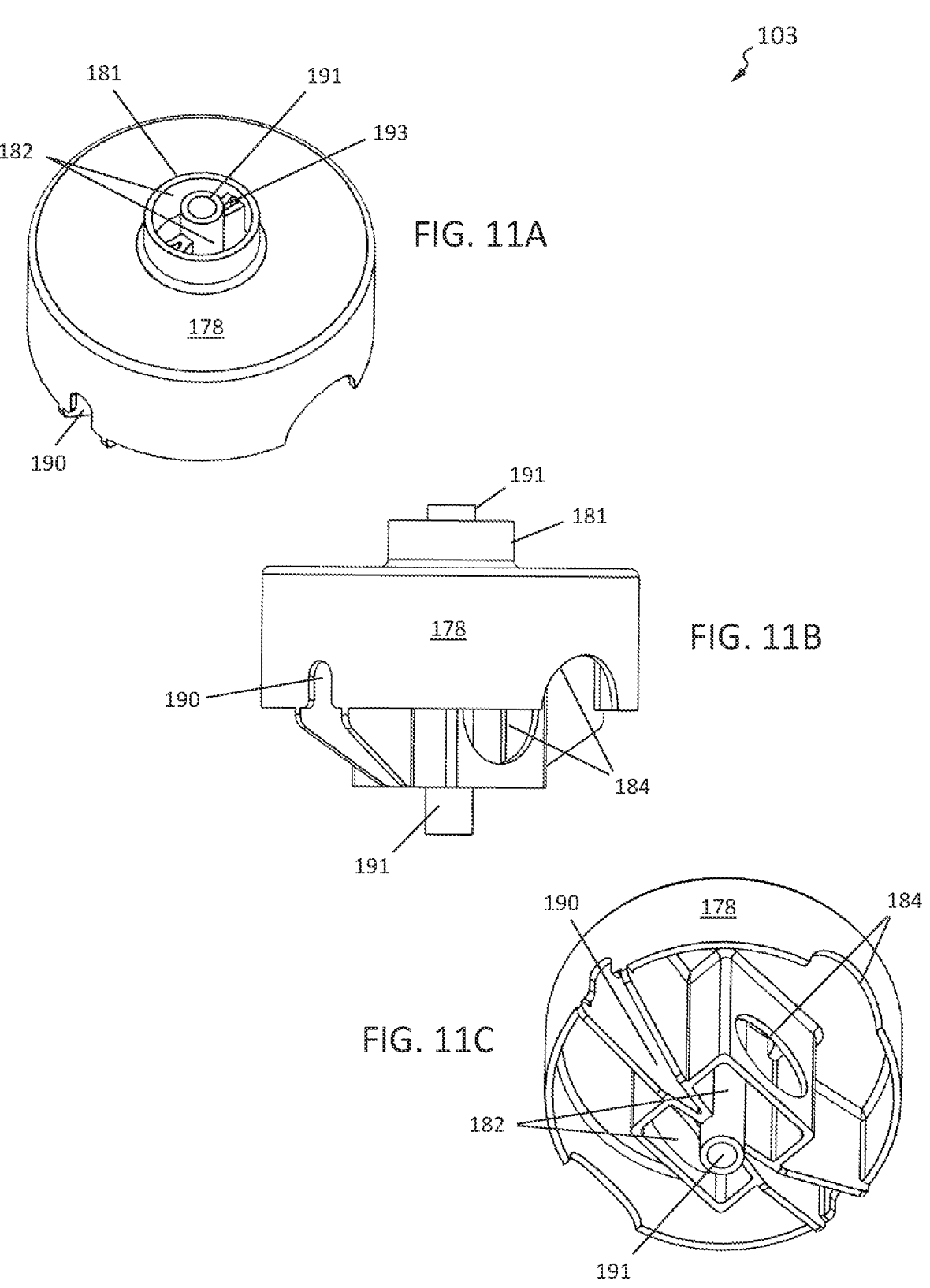
FIGS. 11A-C show enlargements of perspective and side views of a vital new component called the Distribution Globe which is the heart and focal point of the tether termination assembly (TTA)

FIGS. 11A-B, FIG. 11A shows a cylindrical shaped component which is primary to the Tether Termination Assembly 176 of the current invention for interconnecting all of the utilitarian connections of gas, power, and communications from NOC 101 to Tether 104. That valued component is Distribution Globe 178. Centered on the top surface of the distribution globe is a Receiving Port 181 with a round Fiber Optics Conduit 191 in the center. Electrical Conductor Conduits 193 are located on opposing sides adjacent to the fiber optics conduit and together they align to form a partition wall which divides the tether interior into two opposing sections which are used as Gas Flow Tubes/Chambers 182. FIGS. 11B-C show side and bottom perspective views of the Distribution Globe 178 that detail the Fiber Optics Conduit 191 and the two Gas Flow Tubes/Chambers 182 passing through the Globe and out the bottom. Ball Valve Cavities 184 which intersect the gas flow tubes are set to receive a Ball Valve 185 and a remote-control Ball Valve Actuator 186. A Lateral Access Opening 190 is provided to permit screwdriver access to tighten screws on Electrical Couplers 188 housed within the sides of Distribution Globe 178.

Figures 12A, 12B, 12C:
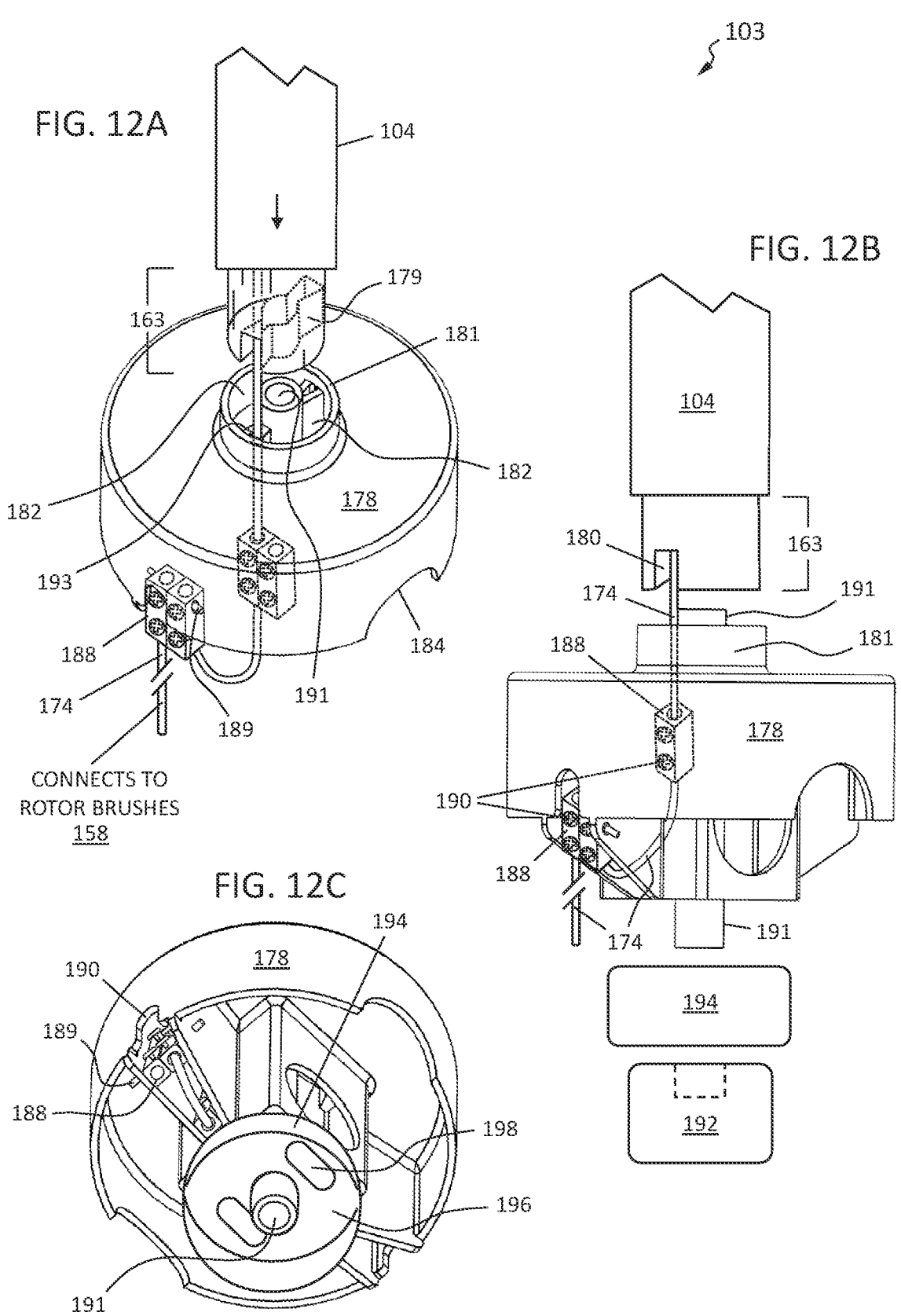
FIGS. 12A-C illustrate enlarged views of the tether, the preparation of the terminal ends of the tether, the electrical connections made for the electrical conductors integral to the tether, the disposition of the fiber optics relay of signals, and the selective diversion of gas flow within the tethered system.

FIG. 12A-C, shown is a top perspective view of a Tether 104 having a Tether Strip Portion 163 where the outer casing has been removed a select distance. The end of the tether is to be prepped with tether end shaping 179 where an Internal Cross Slot 180 is prepared in order for the terminal end of the tether to have a mating fit within Receiver Port 181 of Distribution Globe 178. Electrical Conductors 174 from Tether 104 pass down into and through Electrical Conductor Conduit 193 of the distribution globe where they are received underneath the distribution globe by an Electrical Coupler 188 arrangement having a Pivot Pin 189. The electrical connection is further relayed to Electrical Brushes 158 of Rotor Plate 157. A Gas Flow Diverter Cap 194 is shown which will fit over the Fiber Optics Conduit 191 where Apertures 198 may be rotated into alignment with Gas Flow Chambers 182 of Distribution Globe 178. A Fiber Optics Transmitter 192 also fits over the end of the fiber optics conduit where it receives Fiber Optics Cabling 173.

It is to be understood that in the description given for various components of the systems of this invention that there are often two of the same components although only one may be shown or described. For example, two electrical conductors or two conduits.

Figures 13A, 13B, 13C, 13D:
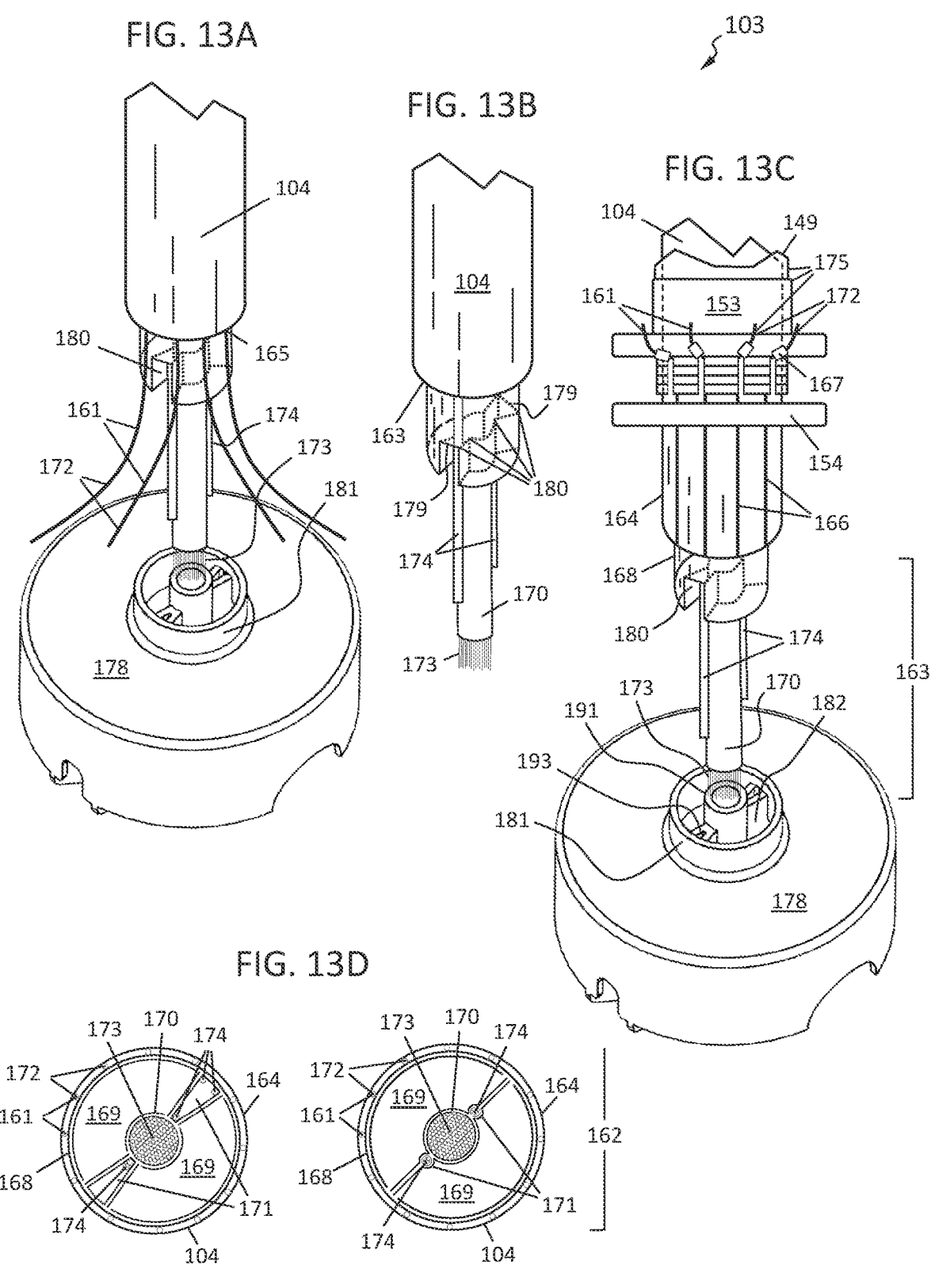
FIGS. 13A-D show top perspective views of the tether and the distribution globe along with a top view of an exemplary cross-section intended for tether construction.

FIGS. 13A-D, show the method used to prepare the Tensile Restraint Fibers 161 for Clamping 167 to the Tether Pipe 149 whereupon their being bonded together they become the primary restraint means of resisting the tensile pulling forces of the aloft aerostat. In FIG. 13A, the Outer Casing 164 of Tether 104 is Stripped 163 back a select distance revealing the set of tensile fibers underneath. In FIG. 13C, those tensile fibers are peeled upwards a select distance where they leave Peel Lines 166 in the outer casing of the Tether 104. A Clamping Adapter 153 is provided on the end of Tether Pipe 149 having slots in the bottom that match the number and spacing of the Tensile Fibers 161. The tensile fibers are bent upwards and through the vertical slots of the clamping adapter. They are each pulled snugly against the bottom of Clamping Adapter 153 where they are driven upwards by Drive Plate 154 and are Clamped and Crimped 167 against the top half of the clamping adapter and Tether Pipe 149. The tensile fibers being in contact with the metal tether pipe, in other words grounded to, present a defined Tether Electrical and Static Dissipation Pathway 175 to ground outside the anchoring vessel through an armature touching the rotating metal pipe or a spark gap jump. Also illustrated in FIGS. 13A and C are Fiber Optics 173 being received in the Fiber Optics Conduit 191 where they are transferred to the bottom of Distribution Globe 178 to terminate within Fiber Optics Transmitter 192 where radio frequency (RF) signaling is employed to relay the telecommunications signals to the stator side of the rotor/stator slip ring arrangement where they are received/sent by NOC 101. In FIG. 13D, a Cross-Section 162 of Tether 104 is shown where the Tensile Fibers 161 are spaced within Outer Casing 164. Electrical Conductors 171 are provided adjacent to and on opposing sides of Fiber Optics Conduit 170 which bears Fiber Optics Cabling 173 within. Gas Flow Tubes/Sections 169 are formed within upon opposing sides of the fiber optics conduit.

Figures 14A, 14B, 14C:
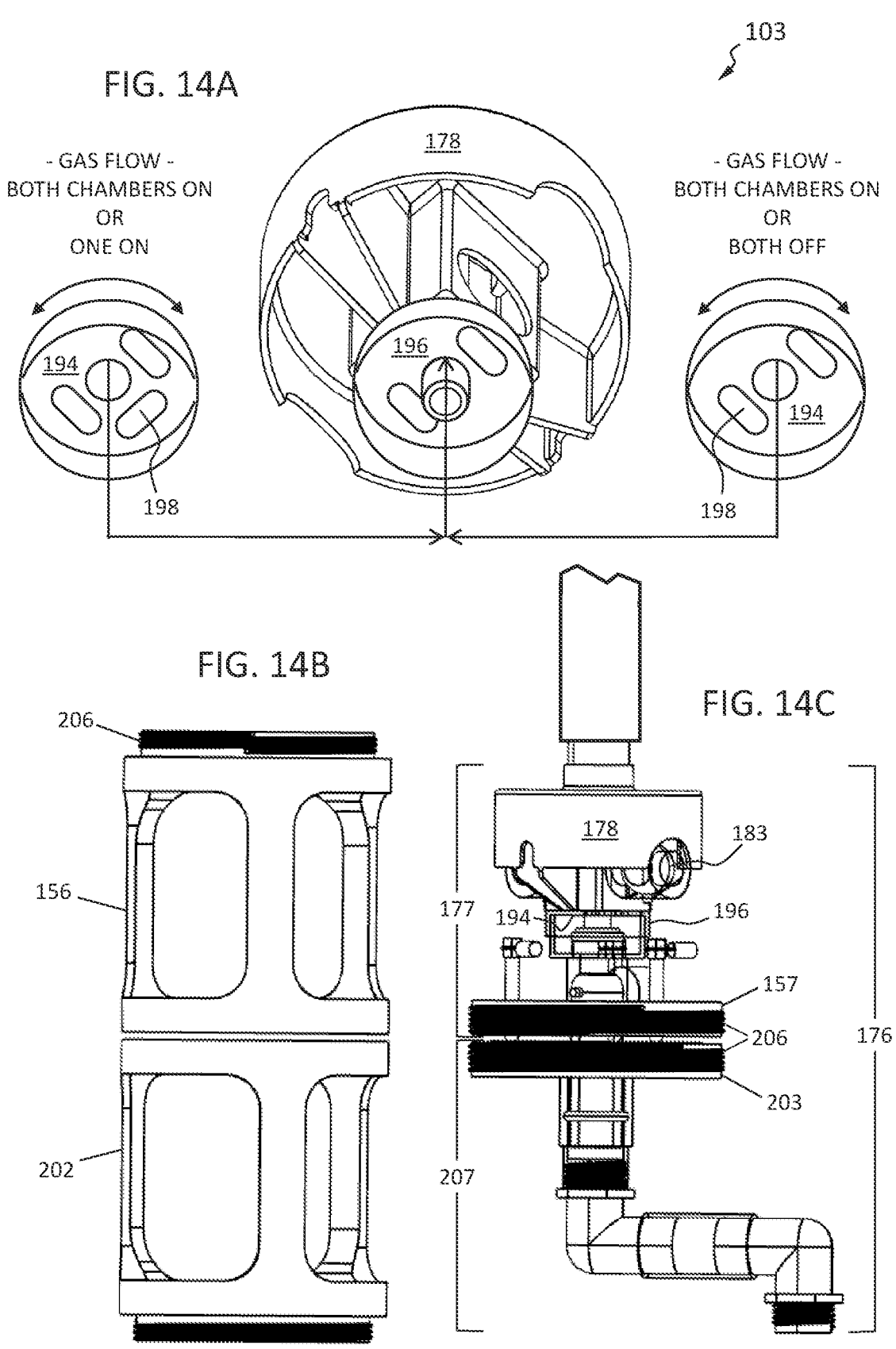
FIGS. 14A-C show bottom perspective views of the distribution globe and divertor plate along with side views of the rotor and stator platforms and the tether termination assembly to be housed within said rotor and stator platforms.

FIGS. 14A-C, FIG. 14A illustrates side by side Gas Flow Diverter Plates 196. By rotating the divertor plate 90 degrees one gas flow arrangement has the flow option of Both Chambers On/One On versus the other gas flow arrangement having the flow option of Both Chambers On/Both Off. FIG. 14B shows a side view of Rotor Platform 156 and Stator Platform 202 stacked in end-to-end relationship. FIG. 14C is a side view of Tether Termination Assembly 176 having a Rotor Housed Portion 177 and a Stator Housed Portion 207 which are to be mutually housed within the stacked rotor/stator platform arrangement depicted in FIG. 14C.

Figures 15A, 15B, 15C:
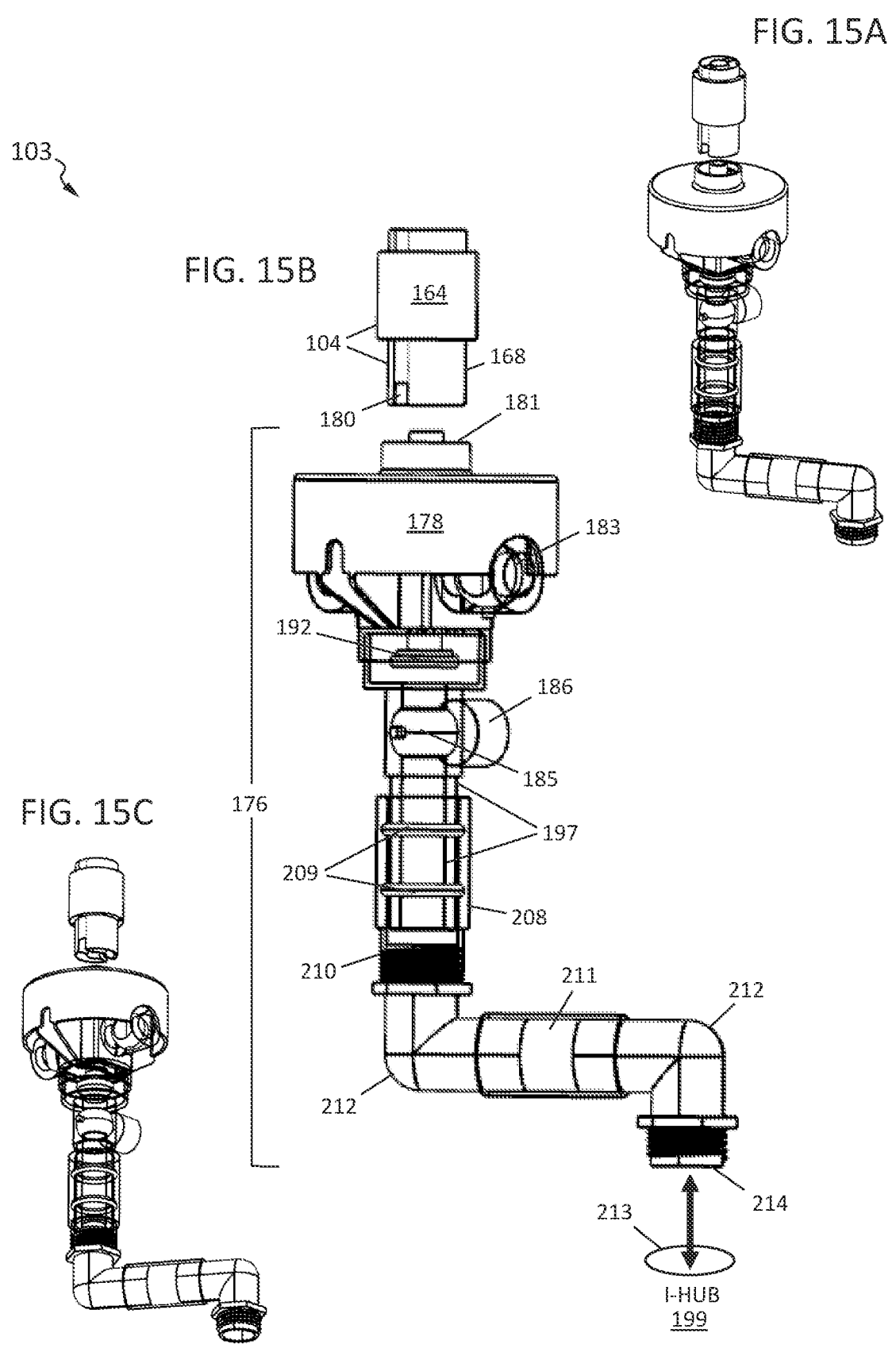
FIGS. 15A-C show transparent views of the gas passageways within the tether termination assembly as depicted in top and bottom perspective illustrations and an enlarged side view. The side view drawing additionally shows the terminal end of the gas passageway exhausting out the bottom of the anchoring vessel through the I-Hub Base where the exiting gas may be filtered and scrubbed or, alternatively, gas may be inputted through this port.

FIGS. 15A-C, FIG. 15B is an enlarged side view of the Tether Termination Assembly 176 showing Tether Outer Casing 164 having an Inner Wall 168 prepped to be received in Distribution Globe 178. A Globe Gas Intake/Exhaust Port 183 is provided which communicates with Gas Chamber 121 inside of Barrel 117. Also shown is a Fiber Optic Transmitter 192 and Ball Valve 185 driven by a Remote-Control Valve Actuator Motor 186 and a Terminal Tailpipe/Valve Stem 197 which fits within Terminal Tailpipe/Valve Stem Receiver 208 and is rotatably sealed within a set of O-rings 209. An Adapter 210 and Elbow 212 and Coupler 211 and another Elbow 212 finish the gas flow passageway where a Tether Gas Flow Termination 214 communicates with an I-Hub Gas Intake/Exhaust Hole situated on I-Hub 199.

Figures 16A, 16B, 16C:
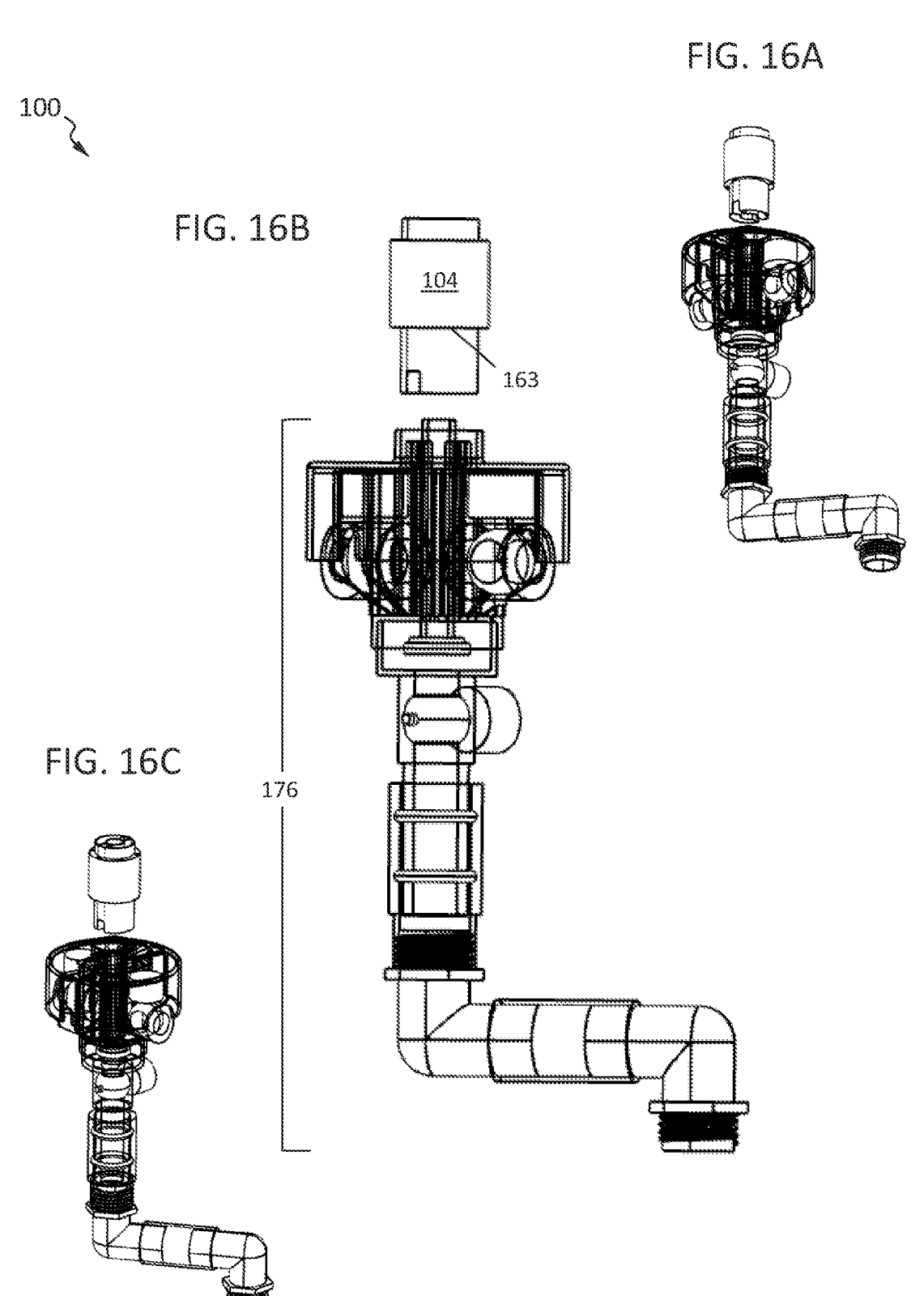
FIGS. 16A-C similarly show fully transparent views of the gas passageways comprising the tether termination assembly.

FIGS. 16A-C where the side and perspective views of the Tether Termination Assemblies shown are transparent showing gas flow passageway detail.

Figures 17A, 17B, 17C:
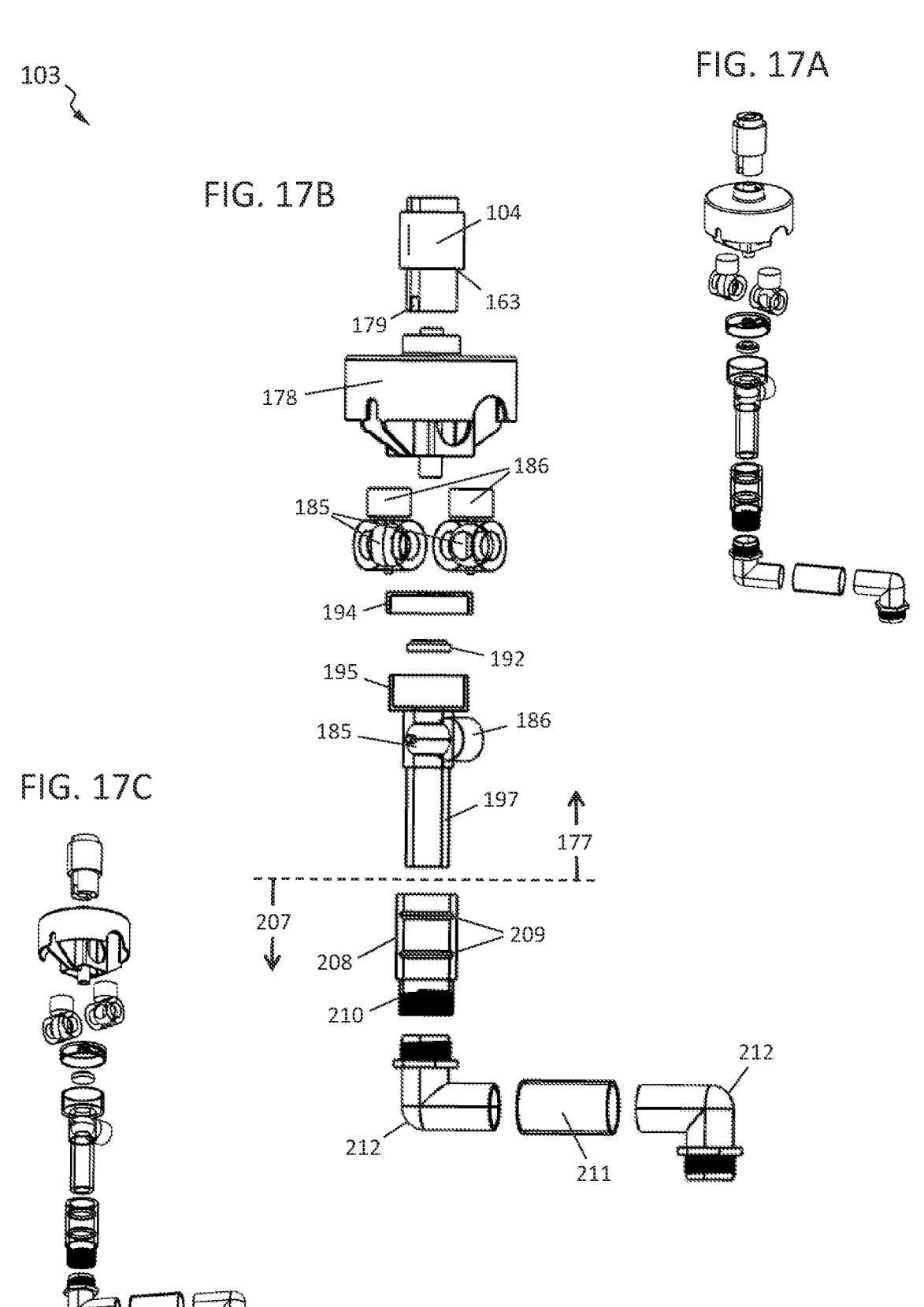
FIGS. 17A-C again show similarly oriented illustrations which show transparent exploded views of the component parts comprising the tether termination assembly.

FIGS. 17A-C where the side and perspective views of the Tether Termination Assemblies shown are exploded showing the individual components.

Figure 18:
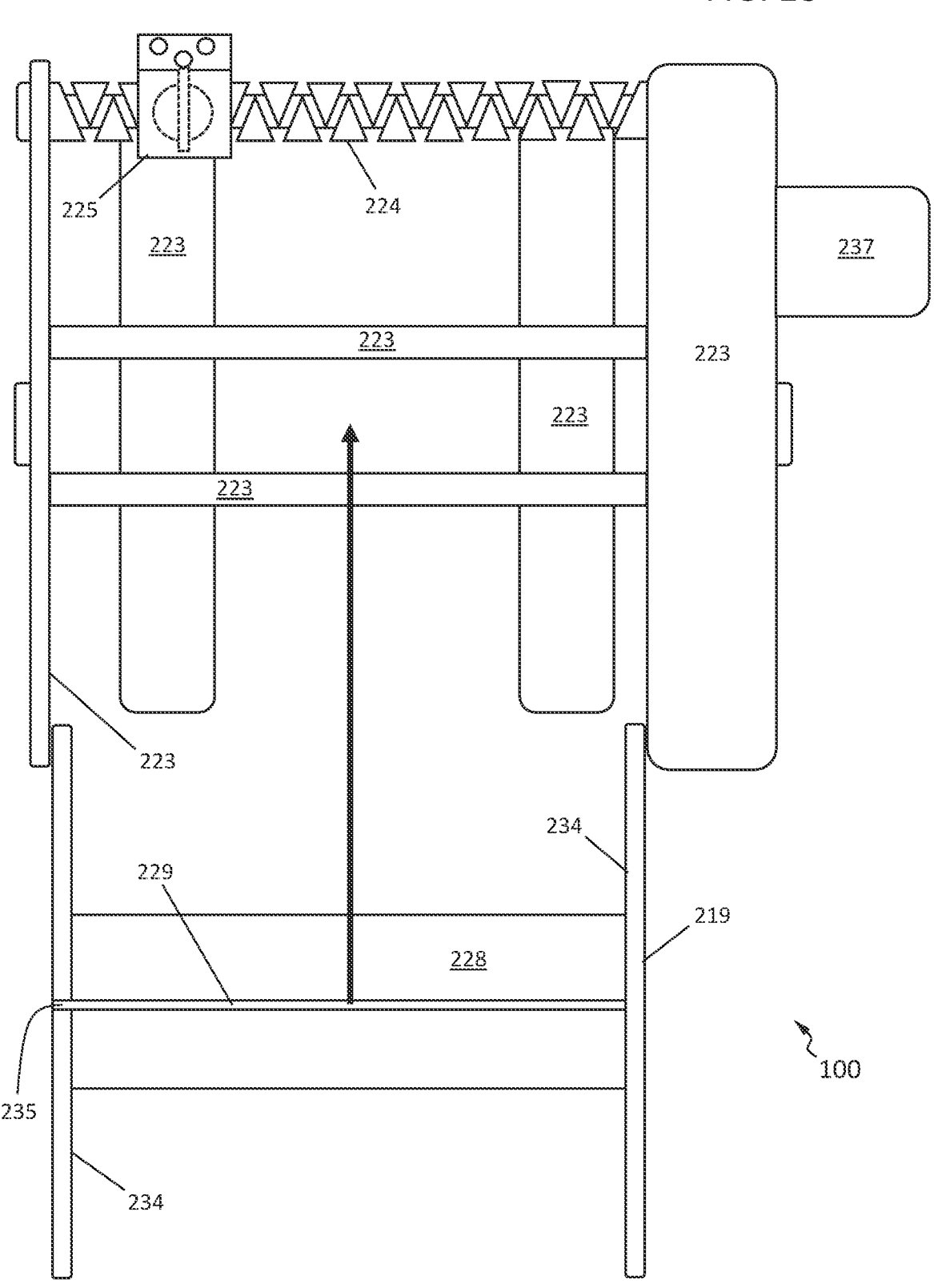
FIG. 18 illustrates a plan view of a tether spool having a physical size capable of retaining and storing a substantial footage of tether capable of reaching a mile or more in the sky. The very large tether spool is designed to be rolled, lifted, or otherwise placed within the physical confines of a tether spool frame whereby a powered winch system will capably deploy or retrieve the aerostat.

FIG. 18 shows the entire length, or some portion, of the Spindle Bed 228 of Tether Spool 219, commonly known as the spindle, is provided with a Spindle Slot 229 having a width sufficient to allow passage and threading of the tether diameter therethrough. In addition to the thru-slot in the spindle, End Plate 234 is provided with an End Plate Slot 235 which communicates with Spindle Slot 229. The end plate slot generally is located on the end plate which directly faces the anchoring vessel and is opposite to its sister end plate at the opposing end of the spool which bears a bi-directional Drive Motor 237 which forcefully turns the tether spool. Since the end plate slot aligns and intersects the spindle slot, they mutually permit unobstructed threading of the tether to and within the spindle interior which is aligned with the central axis of the tether spool spindle. The end plate slot also beneficially serves as a Visual Tether Footage Gauge 236 for viewing the level of tether left on the spool enabling an estimation of the tether footage remaining on the spool.

To contain and hold the very large and heavy Tether Spool 219, a Tether Spool Frame 223 is provided which is designed with an open end and top enabling receipt of the tether spool either horizontally or vertically. The directional arrow shows the lateral movement required to center load the tether spool within the tether spool frame. The spool is laterally held in place while still permitting rotation of the spool within the confines of the spool frame. Vertical insertion of the tether spool is a secondary choice to the preferred embodiment where the spool sits on a low-profile wheeled platform with short distance lift capabilities. The low-profile lift platform carrying the large tether spool may be rolled laterally inside the tether spool frame and then lifted a short distance to reach alignment and insertion within the endplates of the tether spool frame. In this embodiment, the endplates of the bracket would also have to be supplied with short lateral distance compensation capabilities to align and engage a rotational spindle while maintaining the spool position within the frame.

The embodiment depicted in both FIGS. 18 and 19 is the "roll in" version of tether spool alignment, placement, and confinement within the tether spool frame due to the fact that it importantly sidesteps having to lift a very large and heavy prefilled tether spool a considerable height to reach and clear the open tops of the tether spool frame. This is more relevant during emergency replacement of the spool and especially any attempt to replace the spool during inclement weather.

FIG. 19 shows a top view of the tether spool after receiving final placement within the tether spool frame. The back-and-forth level winding of the tether is driven by a Reciprocating Winding Mechanism 224 attached to the top of the Tether Spool Frame 223. The reciprocating winding mechanism drives a Tether Level Wind Guide 225 back and forth across the spool spindle. The tether level wind guide is attached to a Winding Guide Arm 226 which carries a Tether Feed Horn 227. The tether feed horn is assembled around Tether 104 and has cooperative interior shaping so as not to damage a tether under tension as it is being retrieved or deployed. The feed horn carrying the tether repeatedly travels back and forth while laying down adjacent coils of the tether in smooth layers until the respective winding or unwinding of the desired tether footage onto or off of the tether spool is accomplished. The tether level wind guide is actuated by and travels back and forth laterally in unison with the powered rotation of the tether spool in order to lay down adjacent controlled loops and layers of the tether.

Alternative to a spool already full of tether, the spool frame might receive an empty tether spool. Upon threading the end of the tether pre-prepped with the ground-based RSTE destined for insertion within the anchoring vessel generally attached to the ballast tank, the empty tether spool is rotated loading the spool with new tether from a New Tether Supply Spool 222 until reaching the end of that new tether where it is terminally finished out by prepping and adding the remaining RSTE. One advantage from having the selective capability to wind from one spool to another is that you reverse the ends of the tether, thereby extending the life of the tether.

However, in order to achieve the highest degree of expeditious deployment in the field, the preferred embodiment employs a spool which has already been preloaded with a completed tether inclusive of having an RSTE already attached at both ends. Both of these exampled instances result in a fully loaded tether spool inclusive of having the RSTE at the ground end of the tether already threaded within the interior of the spool spindle where it is aligned with the central axis of the tether spool whereby it is ready for insertion and interconnection to the ground-based anchoring vessel and having a RSTE at the opposing end of the spooled tether ready for insertion and interconnection to the anchoring vessel of the aerostat. It should also be recalled that in either example, the lengthy roll of tether contained on the tether spool is filled with fresh lift gas, or alternatively devoid of any gas, whereby a vacuum has been drawn, sealed within, and capped off by closure of a valving system integral to each RSTE.

Since the ends of any profile suffer more strain damage at their points of interconnection or abutment, the novel "quick interchange replacement tether" design of the current invention permits the quick loping off of the two terminal ends of a previously in service tether and re-prepping those ends. This design effectively enables the option of the cutting-off and repreparation of each of the terminal ends of a used "previously in service" tether to ensure tether reliability at both the ground and the aerostat ends. This system enables a reduced time interval for cutoff repair and hookup should it be necessary or, alternatively, the preferred embodiment, provides the option to "near instantly" replace the tether with another pre-prepped and pre-checked tether which is already filled with fresh lift gas.

Significant improvements are made in tether construction through the novel co-tasking of the tensile fibers employed within the overall construction of the tether to not only function as reliable aerostat restraint components but also simultaneously task those tensile fibers to also function as electrical conductors to carry power and potentially conduct a portion of the communications duties and/or to additionally function to dissipate lightning strikes, static, or any other electrical charge buildup due to the hostile ambient environment that the aerostat is required to be stationed and operate within.

A highly novel rotor "Globe Assembly" is safely contained and housed in a fixed position within the rotor platform which itself rotates as integral "part and parcel" of the rotatable TPA (Tether Pipe Assembly). In review, the rotatable TPA (Tether Pipe Assembly) and the stationary THA (Top Hat Assembly) are sub-assemblies which together comprise the master assembly of the RSTE (Removable Sealable Top End) of the anchoring vessel. Upon those two sub-assemblies being unitized as the RSTE, the TPA rotating within the center of the THA, they are inserted, latched, and seal the top ends of their respective Anchoring Vessel systems located at both the Aerostat and the Ground Control Center (GCC) ends of the tethered system. The globe assembly thereby acts as an internal coupler sleeve, affixed within the rotor platform, which facilitates quick and versatile connection and establishment of systemwide gas passage routing, power, and communications hookup between the tether and the aerostat and the tether and the ground control center. This facilitates ultra-quick coupling between the tether and the two separate RSTE (Removable Sealable Top End) assemblies which, in addition to power and communications hookup, features the establishment and the selective employment of the tether's "multiple gas passageways" which are precisely aligned and interconnected by each globe assembly located at both the ground control end and the aerostat end of the tether which are respectively controlled by their own separate remote control gas valving and routing systems.

This multitasking of the tensile fibers has advantages in overall tether utility and construction as well as providing significant gains in overall reduction of tether weight.

Further gains in aerostat control and maintenance are realized through a novel "internal cross-sectional profile" provided for the tether which together with a novel "gas passageway valving system" facilitate planning and use of a multiple of gas passageway routings to be employed between the ground station and the aerostat to facilitate simultaneous 24/7 flow of gas both to and from the aloft "in service" aerostat.

In addition, and very importantly, a quick interconnect/ disconnect system is provided for the tether which makes it fiscally and functionally feasible to provide a pre-prepped "stand by" replacement "tether spool" storing a full complement of pre-checked and pre-approved replacement tether filled with new and/or reconditioned lift gas. This facilitates the very rapid changeout and replacement of the current tether spool of the just retrieved aerostat for the "stand by" replacement tether spool enabling short interval turnaround and redeployment of the newly serviced aerostat back to altitude for continuation of its broadcast, telecommunications, and/or surveillance duties.

Gas within the previously used tether is contained by valves at both ends of the RSTE (Removable Sealable Top End) assemblies and may be scrubbed/reconditioned separate to the aerostat envelope or, alternatively, simply exchanged with a pre-prepped tether containing fresh gas within its length where the terminal end valves remain closed (capped) until linked with the aerostat envelope and the anchoring vessel whereafter they may be selectively opened and operated by their own respective remote control valving systems.

A powered Pull/Retract assist mechanism that retracts the tether under tension before being coiled upon the tether spool in a non-tensioned manner which permits internal gas flow within the tether while coiled upon the spool. Alternative to the Pull/Retract assist mechanism or the horizontal coiling of the tether, a "vertical coiling" retraction spool where the tether is retracted by pull across a perpendicular revolving armbar which lays the vertical coils under less tension.

Another strategy for dealing with tether wall collapse resulting from the retrieval of the aerostat to ground level for service is simply to spool up the tether and not worry with the degree of constriction the tether undergoes while being wound upon the spool. More simply said, allow the wall collapse of a thin or a "partially collapsible by design" tether to take place naturally as the limber tether is wound upon the spool. Then remove the tightly wound spool and replace with a new spool. The tightly wound spool can then be loosely rewound onto an empty spool. Let's examine reasoning for desiring gas circulation to continue within and through the spooled tether while on the aerostat is on the ground. The desire to maintain continuous gas circulation is driven by the need to remove moisture and optimize the purity of the lift gas contained within the large volume of the aerostat envelope, as quickly as possible so that the time between retrieval and aerostat relaunch is minimized to be as short an interval as possible. Time saved on the ground is everything and is absolutely vital to communications and surveillance systems which must remain in the air to accomplish their "on station" service tasking.

New options are now available due the quick connectivity of the RSTE (Removable Sealable Top End) assembly integrally attached to each of the terminal ends of the tether whereby quick disconnect of all of the componential parts, systems, and operations may be broken and reconnected within minutes to the aerostat and/or the ground station. It also, very importantly, gives valuable options as to the crucial placement of critical valving and gas flow interconnections at one or both ends of the tethered system. Also, simultaneous with servicing the main gas envelope, election can be made to replace the entire tether.

The main premise behind the rapid interchangeability of the system of the current invention for exchanging either aerostats, tethers, or tether spools is that upon any of these or other components of the system becoming damaged or otherwise disabled, it is a far better scenario to do all the manufacturing, prep work, specialization of duty adjustments, and/or repairs, independent to the actual site of the deployed aerostat.

All that is needed to make high use of this highly valuable interchangeable system is to transport, or preferably store, the needed functional components nearby the launch site, retrieve the current aloft aerostat, make the material/component exchanges, and redeploy. Time is particularly of the essence in the telecommunications business, and more accurately said, time spent while a system is out of service and on the ground is broadcast time lost, money lost, customers lost or disgruntled, and most importantly, vital services disrupted which have significant life-threatening consequences.

All broadcast methods and scenarios are susceptible to lengthy outages during extreme weather events or other catastrophes but none are more capable of near instantaneous recovery and restoration of services than the interchangeable aerostat system of the current invention. Especially now that most of the manufacturing and prep work may now be done indoors, either on or off-site, out of the elements, stocked ahead of time and then be transported to, or preferably housed on-site, for plug-out and plug-in replaceability.

The ADARS (Aerostat Deployment, Anchorage, Retrieval System) of this invention is the "Swiss Army Knife" equivalent approach for having tools always available to provide rapid "Plug and Play" brevity of on-ground preparation and repair before redeployment of the aerostat back into fulfilling the particular aloft, "On-Station", needs and duties required by that particular aerostat system.

It is requested to be recognized that the preceding description of packaged and/or individual features and functions outlined for the tethered aerostat system of the subject invention are meant as description and illustration only and are not to be construed as limiting in scope, use, or intellectual protection sought for other designs, variations, or diverse embodiments for cooperative and/or parallel applications of usage of the present invention.

Upon further consideration, many other advantages and utilizations of the applicant's invention will become apparent to those skilled in the art from the previous descriptions, drawings, and claims hereupon and it is thereby respectfully requested that these new and varied uses, iterations, and embodiments also fall within the scope of the intellectual protection sought.

Such scope is limited only by the following appended claims as read in light of and connection with the preceding specification and the corresponding illustration.

COMPONENT LIST—QUICK TETHER REPLACEMENT SYSTEM

100) Aerostat Deployment, Anchorage, Retrieval System (ADARS)
101) Network Operations Center (NOC)
102) Aerostat
103) Quick Tether Replacement System (QTRS)
104) Tether
105) Anchoring Vessel (AV)
106) Ballast Tank (Lift Gas Storage/Supply)
107) Deployed Aerostat 108) Retrieved/On Ground Aerostat (Periodic Service Interval)

109) Inverted Anchoring Vessel

110) Horizontal or Vertical Oriented Anchoring Vessel

111) Direct Mounted Base Plate (AV Mounting to Aerostat)

112) Suspended Mounted Base Plate (AV Mounting to Aerostat)

113) Suspension Cabling

114) Utilities Interface Interconnection (Anchoring Vessel and Aerostat)

115) Air Rudder/Foil

116) Inverted Weather Boot

117) Barrel (AV Main Body)

118) Lower Tapered Bearing Bottom Tray/Race (Shelf Inside Barrel)

119) Lower Tapered Bearing Top Tray (Gear/Tray/Coupler Assembly)

120) Lower Tapered Roller Bearing

121) Gas Chamber (Barrel Interior)

122) Service Hatch

123) Service Hatch Door (Clear)

124) Top Open End (AV Barrel)

125) Insert/Twist Vertical Latching (Initially Connects THA to Barrel Top)

126) Draw Clamp Latches (Secondary Latching of THA to Barrel Top)

127) Removable Sealable Top End (RSTE)

128) Removable Rotatable Tether Pipe Assembly (RRTPA)

129)

130) Top Hat Assembly (THA)

131) Brim (Latches to and Seals Top Opening of Barrel)

132) Bushing (THA Centered and Sealed Fit within Top of Barrel)

133) Upper Tapered Bearing Top Tray/Race (Under THA Bushing)

134) Upper Tapered Bearing Bottom Tray (Gear/Tray/Coupler Assembly)

135) Upper Tapered Roller Bearing

136) Chimney (Centers/Seals Exit of Rotating Tether Pipe from AV)

137) Chimney Upper Bearing/Tray (Forms Top Seal around Tether Pipe)

138) Chimney Lower Bearing/Tray (Forms Lower Seal around Tether Pipe)

139) Auxiliary Gas Chamber (Formed within Chimney between Seals)

140) Chimney Gas Port (Intake/or Discharge)

141)

142) Tether Pipe Assembly (TPA)

143) Gear/Tray/Coupler Assembly (GTCA)

144) Assembly Coupler (Interconnects Tether Pipe to Surrounding Gears)

145) Locking Flanges

146) Vertical Stop

147) Main Drive Gear

148) Drive Motor (Bi-Directional Powered Turning of TPA)

149) Tether Pipe

150) Tether Pipe Adapter

151) Tether Pipe Slot (Connects One Gas Conduit in Tether to Chimney)

152) Assembly Plate

153) Clamping Adapter (Tether Tensile Fibers)

154) Drive Plate

155) Rotor Platform Assembly (Sub-Assembly of Tether Pipe)

156) Rotor Platform

157) Rotor Plate

158) Spring Biased Electrical Brushes

159) Gas Circulation Openings

160) Central Hole (Rotor Plate)

161) Tensile Restraint Fibers

162) Tether Cross-Section

163) Tether Stripped Portion (Outer Casing Removed)

164) Tether Outer Casing (Tether Exterior Sheath)

165) Tensile Fibers Strip Point

166) Peel lines (Remain on Tether after Peeling Back Tensile Fibers)

167) Clamped Tensile Fibers (Tether Pull-Out Prevention)

168) Inner Wall (Interior Conduit of Tether)

169) Tether Gas Flow Tube/Section (Gas Chambers within Hollow Tether)

170) Conduit for Fiber Optics (Tether)

171) Conduit for Electrical Conductors (Tether)

172) Tether Electrical Dissipation Cabling (Tensile Fibers of Tether)

173) Fiber Optics (Tether Communications Cabling)

174) Electrical Conductors (Tether Power Cabling)

175) Tether Electrical and Static Dissipation Pathway (From Tether Pipe)

176) Tether Termination Assembly (TTA)

177) Rotor Housed Portion (Tether Termination Assembly)

178) Distribution Globe (Tether Termination Hookup (Housed in Rotor)

179) Tether Terminal Ends Shaping (Tether Strip/Preparation)

180) Internal Cross Slot (Prepared Shape in Terminal End of Tether)

181) Globe Receiver Port (Globe to Tether Reception/Fastening/Sealing)

182) Gas Flow Interconnection Chambers (Globe Receiver)

183) Globe Gas Intake/Exhaust Ports (Connect Tether/AV Gas Chambers

184) Ball Valve Cavity (Globe)

185) Ball Valve (System Gas Flow Control)

186) Remote Control Valve Actuator Motor (Opens/Closes Ball Valve)

187)

188) Electrical Coupler (Globe Electrical Connection of Tether to Rotor)

189) Pivot Pin (Pivotally Supports Electrical Coupler within Globe)

190) Lateral Access Opening (Screwdriver Insertion to Electrical Coupler)

191) Fiber Optics Conduit (Globe)

192) Fiber Optic Transmitter (Fiber Optics Termination)

193) Electrical Conductors Conduit (Globe)

194) Gas Flow Divertor Cap (Aligns with Either or Both Gas Chambers)

195) T-Shaped Adapter (Gas Flow around RF Fiber Optics Transmitter)

196) Gas Flow Divertor Plate

197) Terminal Tailpipe/Valve Stem (RSTE Quick Connect/Disconnect)

198) Aperture

199) I-Hub (AV Base)

200) Shutoff Valves (Main Gas Control Valves for Ballast Tank/Aerostat)

201) Stator Platform Assembly (Sub-Assembly of I-Hub)

202) Stator Platform

203) Stator Plate

204) Conductor Tracks

205) Enlarged Central Hole (Stator Plate)

206) Threads

207) Stator Housed Portion (Tether Termination Assembly)

208) Tailpipe/Valve Stem Receiver

209) O-Rings

210) Adapter

211) Coupler

212) Elbow (Terminates outside of AV)

213) I-Hub Gas Intake/Exhaust Hole (Remove Old Gas or Add New Gas)

214) Tether Gas Flow Termination (Intakes or Exhausts Gas/Moisture)

215) Bleed Valve (Evacuate Contaminated Gas/Moisture from System)

216) Combined Tether Pipe/Tether Termination Assembly

217) Combined THA/TPA/TTA (Together Form and Comprise RSTE/RRTPA)

218)

219) Tether Spool (Tether Storage & Aerostat Deployment/Retrieval)

220) Mobile Transport/Deployment

221) Protective Pot (RSTE)

222) New Tether Supply Spool

223) Tether Spool Frame

224) Reciprocating Winding Mechanism

225) Tether Level Wind Guide

226) Winding Guide Arm

227) Tether Feed Horn (Tether Low Friction Retrieval/Deployment Guide)

228) Spindle Bed (Tether Storage)

229) Spindle Slot (Thread Tether)

230) Spindle End Opening (Provides Access to Inside Spindle)

231) Spindle Interior

232) Bell Reducer

233) Rigid Tether Encasement (Keyed Drive Interlocks AV to Tether Spool)

234) End Plate

235) End Plate Slot (Thread Tether)

236) Visual Tether Footage Gauge (End Plate Slot)

237) Drive Motor (Bi-Directional Powered Turning of Tether Spool)

What is claimed is:

1. A rapidly removable and replacement aerostat tether apparatus comprising:

(a) an aerostat tether having a hollow tube disposed within the aerostat tether connecting a first end of the aerostat tether to a second end of the aerostat tether;

(b) a plurality of electrical or command cables disposed on or within the aerostat tether connecting the first end of the aerostat tether to the second end of the aerostat tether;

(c) a first removable sealable top end (RSTE) assembly having a piston type valve, a plurality of races or contacts corresponding to the plurality of electrical cables disposed on or within the aerostat tether, and a gas passage in the first removable sealable top end (RSTE) assembly said first removable sealable top end (RSTE) assembly connected to the first end of the aerostat tether and the plurality of electrical or command cables disposed on or within the first end of the aerostat tether; and (d) a second removable sealable top end (RSTE) assembly identical to or substantially identical to the first removable sealable top end (RSTE) assembly said second removable sealable top end (RSTE) assembly having a piston type valve, a plurality of races or contacts corresponding to the plurality of electrical cables disposed on or within the aerostat tether and the first removable sealable top end (RSTE) assembly and a gas passage in the second removable sealable top end (RSTE) assembly, said second removable sealable top end (RSTE) connected to the second end of the aerostat tether and connecting the hollow tube and the plurality of electrical or command cables from the first end of the aerostat tether to the second end of the aerostat tether.

2. The apparatus of claim 1 wherein the aerostat tether is disposed on a spool.

3. The apparatus of claim 2 wherein the hollow tube and the gas passage in the first RSTE assembly and second RSTE assembly are under a reduced pressure or vacuum.

4. The apparatus of claim 2 wherein the hollow tube and the gas passage in the first RSTE assembly and second RSTE assembly are filled with a lift gas.

5. The apparatus of claim 4 wherein said lift gas is helium.

6. The apparatus of claim 1 wherein said first removable sealable top end (RSTE) assembly and said second removable sealable top end (RSTE) assembly are rotatably and interchangeably securable within a cylindrical housing.

7. The apparatus of claim 6 wherein the cylindrical housing is disposed horizontal to the surface of the earth.

8. The apparatus of claim 7 wherein the cylindrical housing is a second cylindrical housing disposed perpendicular to the surface of the earth on an aerostat.

9. The apparatus of claim 8 wherein the second cylindrical housing has an air rudder.

10. The apparatus of claim 1 wherein the hollow tube is divided into two separate flow tubes or the hollow tube is two separate flow tubes.

11. The apparatus of claim 10 wherein the first removable sealable top end (RSTE) assembly and the second removable sealable top end (RSTE) assembly each have a second gas passage therein.

12. The apparatus of claim 11 wherein the first removable sealable top end (RSTE) assembly and the second removable sealable top end (RSTE) assembly each have a rotation positioning device to maintain the first gas passage in the first removable sealable top end (RSTE) assembly in a rotational position corresponding to the rotational position of the first gas passage in the second removable sealable top end (RSTE).

13. The apparatus of claim 12 wherein the rotation positioning device in the first removable sealable top end (RSTE) assembly and the second removable sealable top end (RSTE) assembly are controlled by a computer.

* * * * *